United States Patent
Lay et al.

(10) Patent No.: US 11,039,514 B2
(45) Date of Patent: Jun. 15, 2021

(54) INTERACTIVE PORTABLE LIGHTING SYSTEM

(71) Applicant: Casper Sleep Inc., New York, NY (US)

(72) Inventors: Jordan Lay, San Francisco, CA (US); Defne Civelekoglu, San Francisco, CA (US); John Cohen, San Francisco, CA (US); Louis Giacalone, III, Staten Island, NY (US); Shail Shah, Oakland, CA (US); Josef Norgan, San Francisco, CA (US); Christopher Sa Glaister, Oakland, CA (US); Shyam Srinivasan, Oakland, CA (US); Steve Martisauskas, San Francisco, CA (US)

(73) Assignee: Caster Sleep Inc., New York, NY (US)

( * ) Notice: Subject to any disclaimer, the term of this patent is extended or adjusted under 35 U.S.C. 154(b) by 0 days.

(21) Appl. No.: 16/241,665

(22) Filed: Jan. 7, 2019

(65) Prior Publication Data

US 2019/0215926 A1    Jul. 11, 2019

Related U.S. Application Data

(60) Provisional application No. 62/614,997, filed on Jan. 8, 2018, provisional application No. 62/730,527, filed on Sep. 12, 2018.

(51) Int. Cl.
*H05B 45/20* (2020.01)
*F21V 23/04* (2006.01)
(Continued)

(52) U.S. Cl.
CPC ............ *H05B 45/20* (2020.01); *F21L 4/08* (2013.01); *F21V 15/01* (2013.01); *F21V 23/0464* (2013.01); *F21V 23/0492* (2013.01); *H05B 45/10* (2020.01); *H05B 47/105* (2020.01); *H05B 47/11* (2020.01); *H05B 47/19* (2020.01);
(Continued)

(58) Field of Classification Search
None
See application file for complete search history.

(56) References Cited

U.S. PATENT DOCUMENTS 1,893,548 A    1/1933   Hardy
D107,880 S     1/1938   Marsack
(Continued)

FOREIGN PATENT DOCUMENTS

CN    102822224    12/2012
CN    203328338    12/2013
(Continued)

OTHER PUBLICATIONS

Dodow "Product Guide" purchased 2018 (13 pages).
(Continued)

*Primary Examiner* — Amy Cohen Johnson
*Assistant Examiner* — Jianzi Chen
(74) *Attorney, Agent, or Firm* — Koffsky Schwalb LLC

(57) ABSTRACT

An interactive lighting system includes a group of one or more portable lamps designed to respond to user's spatial manipulation of a lamp to control the system. The lamps can be wirelessly linked to operate in unison, and each lamp could also include an ambient light sensor, which helps the system to optimize illumination characteristics and profile.

18 Claims, 31 Drawing Sheets

(51) Int. Cl.
*F21V 15/01* (2006.01)
*F21L 4/08* (2006.01)
*H05B 45/10* (2020.01)
*H05B 47/11* (2020.01)
*H05B 47/19* (2020.01)
*H05B 47/105* (2020.01)
*H02J 7/00* (2006.01)
*F21Y 115/10* (2016.01)
*H02J 7/02* (2016.01)

(52) U.S. Cl.
CPC ......... *F21Y 2115/10* (2016.08); *H02J 7/0068* (2013.01); *H02J 7/025* (2013.01)

(56) References Cited

U.S. PATENT DOCUMENTS

| | | | |
|---|---|---|---|
| 2,399,235 A | 4/1946 | Leslie | |
| 2,399,625 A | 4/1946 | Leslie | |
| 3,400,413 A | 9/1968 | La Grossa | |
| D256,734 S | 9/1980 | Riley | |
| 5,023,970 A | 6/1991 | Tesch | |
| 5,219,307 A | 6/1993 | Morrison | |
| 5,291,625 A | 3/1994 | Leslie | |
| 5,294,181 A | 3/1994 | Rose | |
| 5,561,876 A | 10/1996 | Petruzella | |
| 6,175,890 B1 | 1/2001 | Yamaura | |
| 6,175,980 B1 | 1/2001 | Gaither | |
| 6,301,730 B1 | 10/2001 | Delfs | |
| 6,305,317 B1 | 10/2001 | Spiegel | |
| D486,877 S | 2/2004 | Peterson | |
| D487,207 S | 3/2004 | Manuel | |
| 6,983,500 B2 | 1/2006 | Wootten | |
| D525,740 S | 7/2006 | Parker | |
| D551,704 S | 9/2007 | Nakamura | |
| D581,713 S | 12/2008 | Berke | |
| 7,530,127 B2 | 5/2009 | Leifermann | |
| 7,614,362 B2 | 11/2009 | Dunn | |
| D605,337 S | 12/2009 | Zhang | |
| 7,788,750 B2 | 9/2010 | Norstrem | |
| D629,150 S | 12/2010 | Douloubakas | |
| D639,492 S | 6/2011 | Lee | |
| 8,051,514 B2 | 11/2011 | Yarmer | |
| D664,303 S | 7/2012 | Chauncey | |
| 8,245,339 B2 | 8/2012 | Murray | |
| D674,644 S | 1/2013 | Stewart | |
| D675,855 S | 2/2013 | Reeves | |
| D679,870 S | 4/2013 | Williams | |
| D694,746 S | 12/2013 | Akana | |
| D696,044 S | 12/2013 | Robilotto | |
| D702,971 S | 4/2014 | Mitchell | |
| D702,972 S | 4/2014 | Busch | |
| D722,239 S | 2/2015 | Russell | |
| 8,959,683 B2 | 2/2015 | Rochlin | |
| D723,304 S | 3/2015 | Chang | |
| D724,254 S | 3/2015 | Sun | |
| D725,832 S | 3/2015 | Coulter | |
| D731,209 S | 6/2015 | Fux | |
| 9,085,125 B2 | 7/2015 | Gesquière | |
| D747,899 S | 1/2016 | Klein | |
| D770,672 S | 11/2016 | Ju | |
| D773,209 S | 12/2016 | Jaigobin | |
| D776,960 S | 1/2017 | Suzuki | |
| D779,856 S | 2/2017 | Rich | |
| D785,370 S | 5/2017 | Randall | |
| D791,494 S | 7/2017 | Bosch | |
| D796,725 S | 9/2017 | Recker | |
| D798,077 S | 9/2017 | Schmitt | |
| D802,324 S | 11/2017 | Bucove | |
| D812,643 S | 3/2018 | Akana | |
| D815,335 S | 4/2018 | Lin | |
| D843,418 S | 3/2019 | Demin | |
| D848,051 S | 5/2019 | Huang | |
| D850,682 S | 6/2019 | DeBrunner | |
| D860,257 S | 9/2019 | Akana | |
| D861,227 S | 9/2019 | Sonneman | |
| D861,964 S | 10/2019 | Lin | |
| D863,356 S | 10/2019 | Akana | |
| 2003/0181538 A1 | 9/2003 | Martel | |
| 2003/0233706 A1 | 12/2003 | Birch | |
| 2004/0154101 A1 | 8/2004 | Digirolamo | |
| 2005/0210595 A1 | 9/2005 | Di Stasio | |
| 2006/0046024 A1 | 3/2006 | Huntley | |
| 2006/0272582 A1 | 12/2006 | Dunn | |
| 2007/0040424 A1 | 2/2007 | Neustat | |
| 2007/0226911 A1 | 10/2007 | Gladney | |
| 2007/0273539 A1 | 11/2007 | Gananathan | |
| 2008/0010751 A1 | 1/2008 | Kemper | |
| 2008/0116403 A1* | 5/2008 | Shelbourn ............ E02F 9/2267 251/58 |
| 2008/0127897 A1 | 6/2008 | Flannery | |
| 2009/0089933 A1 | 4/2009 | Letton | |
| 2009/0106894 A1 | 4/2009 | Yeo | |
| 2009/0151072 A1 | 6/2009 | Jones, III | |
| 2009/0172881 A1 | 7/2009 | Peterson | |
| 2010/0038882 A1* | 2/2010 | Chimento ............ A01B 59/006 280/477 |
| 2010/0058541 A1 | 3/2010 | Kemper | |
| 2010/0087561 A1 | 4/2010 | Abraham | |
| 2010/0160473 A1 | 6/2010 | Neff | |
| 2010/0205738 A1 | 8/2010 | Pollack | |
| 2010/0269262 A1 | 10/2010 | Warren | |
| 2011/0061168 A1 | 3/2011 | Farley | |
| 2011/0067183 A1 | 3/2011 | Hawkins | |
| 2011/0154576 A1 | 6/2011 | Warren | |
| 2011/0252572 A1 | 10/2011 | Morrison | |
| 2011/0290834 A1 | 12/2011 | Pelz | |
| 2012/0001548 A1 | 1/2012 | Recker | |
| 2013/0247828 A1 | 9/2013 | Tedaldi | |
| 2013/0263377 A1 | 10/2013 | Wootten, Jr. | |
| 2013/0263386 A1 | 10/2013 | Romero | |
| 2014/0039082 A1 | 2/2014 | Peterson | |
| 2014/0059765 A1 | 3/2014 | Harris | |
| 2014/0082846 A1 | 3/2014 | Blazar | |
| 2014/0099468 A1 | 4/2014 | Cai | |
| 2014/0130255 A1 | 5/2014 | Montano, Jr. | |
| 2014/0189955 A1 | 7/2014 | Alletto, Jr. | |
| 2014/0208517 A1 | 7/2014 | Gross | |
| 2014/0227552 A1 | 8/2014 | Lau | |
| 2014/0230735 A1 | 8/2014 | Coulter | |
| 2014/0250596 A1 | 9/2014 | De La Place | |
| 2014/0283303 A1 | 9/2014 | Rochlin | |
| 2015/0000042 A1 | 1/2015 | Randall | |
| 2015/0074911 A1 | 3/2015 | Dungan | |
| 2015/0135435 A1 | 5/2015 | Ueda | |
| 2015/0296995 A1 | 10/2015 | Krim | |
| 2016/0169490 A1 | 6/2016 | Kijima | |
| 2016/0224750 A1 | 8/2016 | Kethman | |
| 2017/0172240 A1 | 6/2017 | Massey | |
| 2019/0186704 A1* | 6/2019 | Qiu ............ F21V 21/0824 |
| 2019/0230434 A1 | 7/2019 | Stanley | |

FOREIGN PATENT DOCUMENTS

| | | |
|---|---|---|
| DE | 10311434 | 9/2004 |
| GB | 1572763 | 8/1980 |
| GB | 2369569 | 6/2002 |
| WO | 2013157534 | 10/2013 |
| WO | 2014105687 | 7/2014 |
| WO | 2019089830 A1 | 5/2019 |

OTHER PUBLICATIONS

Fivefive S.A.S. "Holi the Little Book to Sleep and Wake Up Bright" purchased in 2018 (6 pages).
Fivefive S.A.S. "Manual Multilanguage v2.1" Copyright 2013 (7 pages).
General Electric Company "C-Sleep" product packaging Purchase date unknown (2 pages).
General Electric Company Product Guide for GE Sol Lamp purchased 2018 (9 pages).
International Search Report, Written Opinion of ISA, PCT/US2019/12582 (dated Apr. 25, 2019) (14 pages).

(56) References Cited

OTHER PUBLICATIONS

Koninklijke Philips N.V. "Philips HealWell White paper" 2014 (12 pages).
Koninklijke Philips N.V. "Philips Lighting University—Connecting LEDs a Quick Reference Guide" 2014 (77 pages).
Lighting Science "Awake & Alert Biological lights" LED-product packaging Purchase date unknown (3 pages).
Nox "User Manual for Smart Sleep Light Sleepace" received in 2018 (12 pages).
Pablo Design "UMA Setup Guide & Owners Manual" purchased 2017 (8 pages).
Philips "Hue Personal Wireless Lighting Get started with Philips Hue" brochure purchased 2017 (6 pages).
Philips "Hue Personal Wireless Lighting" pamphlet Purchased 2017 (2 pages).
Philips "Wake-up Light" product packaging Purchase date unknown (1 page).
Philips Lighting Holding B.V. "Hue Personal Wireless Lighting" product packaging 2016 (2 pages).
Philips Lighting Holding B.V. "User manual" Jan. 30, 2017 (2 pages).
Twist Product Guide purchased 2017 (2 pages).
Up Light Corp. "Smart Wake Up Light" product packaging Purchase date unknown (2 pages).
Wout van Bommel, at al., Koninklijke Philips Electronics N.V. "Lighting Hardware" Copyright 2011 (107 pages).
Notice of Allowance dated Apr. 2, 2020, for U.S. Appl. No. 29/667,664 (pp. 1-5).
Notice of Allowance dated Apr. 30, 2020 for U.S. Appl. No. 29/667,664 (pp. 1-4).
Office Action dated Nov. 29, 2019 for U.S. Appl. No. 29/667,664 (pp. 1-7).
International Search Report and Written Opinion for PCT/US19/12582, dated Apr. 25, 2019, 14 pages.
International Search Report, Written Opinion of ISA and Search History, PCT/US2015/026564, dated Aug. 31, 2015. (19 pages).
Communication from Thomas Petr received in PCT/US2015/026564, dated Feb. 27, 2016. (1 page).
Supplementary Partial European Search Report for EP 15 78 3835 (dated Nov. 14, 2017) (14 pages).
Dormia Website Existing at Least as Early as Jun. 14, 2008. (2 pages).
Specification and Build Sheet for Dormia Radiance Mattress dated Jun. 14, 2007. (2 pages).
Correspondence Regarding Distribution of Dormia Radiance Mattress, Authored by Classic Brands, LLC, dated Nov. 1, 2007. (1 pg).
Casper Pillow review. Sleepopolis. Published on Jan. 22, 2016. Website found at: https://www.youtube.com/watch?v=h4AhiXbEO3U. (15 pages).
Third-Party Submission Under 37 CFR 1.290 dated Jun. 14, 2016 in U.S. Appl. No. 14/689,945. (15 pages).
Third-Party Submission Under 37 CFR 1.290 dated Jun. 27, 2016 in U.S. Appl. No. 14/689,945. (11 pages).
Third-Party Submission under 37 CFR 1.290 dated Jun. 10, 2016 in U.S. Appl. No. 14/689,945. (9 pages).
Chewy Casper Memory Foam Dog Bed Aug. 28, 2017 [site visited Jan. 23, 2018] Available from Internet URL: <https://www.chewy.com/casper-memory-foam-dog-bed-medium/dp/155149>- (7 pages).
Groupon Water-Resistant Orthopedic Foam Pet Crate Mats, announced 2018 [online], [site visited Jan. 22, 2018] Available from Internet URL: <https://www.groupon.com/latest-deals/gg-waterresistant-orthopedic-fo- am-pet-crate-mats>. (2 pages).
Unboxing and Setting Up a Casper Dog Bed, announced Sep. 14, 2016 [online], [site visited Jan. 23, 2018] Available from Internet URL: <https://www.youtube.com/watch?v=fAEKTatzCTA> at approximately 0:48. (1 page).
The Casper Dog Mattress In-depth Review Demo, announced Feb. 15, 2017 [online], [site visited Jan. 23, 2018] Available from Internet URL: <https://www.youtube.com/watch?v=jRqVxs_M35g> at approximately 2:39. (1 page).

EZ Wash Fleece Lounger Poly-Filled Dog Bed, [site visited Jan. 23, 2018] Available from Internet URL: <https://www.wayfair.com/pet/pdp/3-dog-pet-supply-ez-wash-fleeceloung-er-poly-filled-dog-bed-dpsp1004.html?piid=18825537>. (3 pages).
Luca Crate Cuddler, announced Jul. 15, 2016 [online], [site visited Jan. 23, 2018] Available from Internet URL: <https://www.youtube.com/watch?v=4HeVQP2Z86E> at approximately 0:05. (1 page).
AmazonBasics Padded Pet Bolster Bed, accessed Sep. 16, 2016. (https://www.amazon.com/AmazonBasics-Padded-Pet-Bolster-Bed/dp/B00QHC06UO- ?ie=UTF8&keywords=dog%20bed&qid=1459134598&ref_=sr_1_11&refinements=p_n_fe- ature_keywords_two_browse-bin%3A8002501011%7C8002502011%7C8002503011&s=pet- -supplies&sr=1-11) (6 pages).
PetCo Sweet Dreams Rectangular Bolster Dog Bed , accessed Sep. 16, 2016 (http://www.petco.com/shop/en/petcostore/dog/dog-beds-and-bedding/dog-bed- s/sweet-dreams-rectangular-bolster-dog-bed) (2 pages).
Round Orvis Dog's Nest, accessed Sep. 16, 2016, (http://www.orvis.eom/p/round-orvis-dogs-nest/1h01) (2 pages).
Frontgate Huggy Nest Pet Bed, accessed Sep. 16, 2016 (http://www.frontgate.com/huggy-nest-pet-bed/pet-products/pet-bedsblankets-throws/bolster-pet-beds/802099), (2 pages).
Petsmart K&H Classy Lounger Pet Bed , accessed Sep. 16, 2016. (http://www.petsmart.com/dog/beds/k-h-classy-lounger-petbed-zid36-26968/- cat-36-catid-100063?var_id=36-26968), (1 page).
Bowsers Super Loft Rectangle Avalon, accessed Sep. 16, 2016 (http://www.bowsers.com/pet-beds/super-loft-rectangle/superloft-rectangle-avalon.html) (1 page).
Petco K&H Deluxe Ortho Bolster Sleeper Dog Bed , accessed Sep. 16, 2016 (http://www.petco.com/shop/en/petcostore/dog/dog-beds-and-bedding/dog-bed- s/kandh-deluxe-ortho-bolster-sleeper-dog-bed-in-eggplant-withpaw-prints# (2 pages).
L.L.Bean Premium Denim Dog Bed Set, Rectangular, accessed Sep. 16, 2016 (http://www.llbean.com/llb/shop/44560?feat=507408-GN2&page=premium-denim-dog-bed-set-rectangular) (3 pages).
Amazon Stainmaster Comfy Couch Pet Bed, accessed Sep. 16, 2016 (https://www.amazon.com/STAINMASTER-Comfy-Couch-Large-Olive/dp/B00LQZ18XQ?ie=UTF8&keywords=dog%20bed&qid=1459135646&ref =sr1 426&refinements=p n feature keywords two browse-bin%3A8002501011%7C8002502011%7C8002503011&s=pet-supplies&sr=26) (8 pages).
Jax & Bones Donut Bed, accessed Sep. 16, 2016 (https://www.jaxandbones.com/products/bedding/donut/licorice-donut-bed) (3 pages).
Petsmart Carolina Pet Orthopedic Comfort Couch, accessed Sep. 16, 2016. http://www.petsmart.com/dog/beds/carolina-petorthopedic-comfort-couch-personalized-pet-bed-zid36-/5591/cat-36-catid-100063?var_id=36-5591) (2 pages).
Lux Premium Dog Bed, accessed Sep. 16, 2016 (http://godogbeds.com/product/sample-product-2/) (1 page).
Frontgate Urban Denim Lounger Pet Bed , accessed Sep. 16, 2016 (http://www.frontgate.(X)m/urban-denim-lounger-pet-bed/pet-products/pet-beds-blankets-throws/bolster beds/451775) (3 pages).
Bowsers Donut Bed, accessed Sep. 16, 2016 (http://www.bowsers.com/pet-beds/donut-beds/donut-bed-nickel-weave.html) (1 page).
L.L.Bean Premium Dog Couch, accessed Sep. 16, 2016 (http://www.llbean.com/llb/shop/66388?feat=507408-GN2&page=premium-dog-couch) (3 pages).
Jax & Bones Sleeper Bed, accessed Sep. 16, 2016 (https://www.jaxandbones.com/products/bedding/sleeper/tweed-cremesleeper-bed), (2 pages).
Orvis ToughChew Dog Bed with Polyester Fill, accessed Sep. 16, 2016 (http://www.orvis.com/p/toughchew-rectangle-dogbed/0h4c) (2 pages).
Orvis Wraparound Fleece Dog Bed with Memory Foam, accessed Sep. 16, 2016 (http://www.orvis.com/p/wraparound-fleecedog-bed/2es4) (2 pages).
Orvis Deep Dish Dog Bed with Memory Foam, accessed Sep. 16, 2016 (http://www.orvis.com/p/deep-dish-dog-bed/2c9b) (2 pages).
Bowsers Urban Lounger, accessed Sep. 16, 2016 (http://www.bowsers.com/pet-beds/urban-lounger/urban-loungereverest.html- ) (1 page).
Doca pet Zz Bed, accessed Sep. 16, 2016 (https://www.docapet.com/product/zz-bed/) (2 pages).

(56) References Cited

OTHER PUBLICATIONS

Jax & Bones Memory Foam Bed, accessed Sep. 16, 2016 (https://www.jaxandbones.com/products/bedding/memory-foam/juniper-memory-foam-pillow) (2 pages).
Orvis Tempur-Pedic.RTM. Deep Dish Dog Bed, accessed Sep. 16, 2016. (http://www.orvis.com/p/orvis-tempur-pedic-deepdish-dog-bed/2gr6) (2 pages).
World of Angus Dog Bed, accessed Sep. 16, 2016, (http://worldofangus.com/collections/the-dog-bed-collection/products/thedog-bed) (4 pages).
Howlpot My Territory, accessed Sep. 16, 2016. (http://www.howlpot.com/product/detail.html?product_no=30&cate_no=1&displ-ay_group=2) (9 pages).
Love Thy Beast Flip Stitch Bed, accessed Sep. 16, 2016 (http://www.lovethybeast.com/collections/sleep/products/fiip-stitchbed-grey-blacblack) (7 pages).
Shinola Dolostone Dog Bed, accessed Sep. 16, 2016 (http://www.shinola.com/shop/pet-accessories/dolostone-dogbed.html#color=Ashen%220Gray) (2 pages).
Ruffler Urban Sprawl, accessed Sep. 16, 2016 (http://www.ruffwearcom/Urban-Sprawl-Plush-Dog-Bed?sc=2&category=17) (2 pages).
Marlon Pilvi Cushion http://en.marlonshop.com/product/Pilvi-Cushion/50/?cate_no=1&display_group=2), accessed Sep. 16, 2016 (13 pages).
Japanese Office Action (with English language translation) for Application No. 2017-507687, dated Apr. 2, 2019, 9 pages.
Downlite Downlite Dream Naturally 300 Thread Count Wool Down Comforter, accessed Jul. 13, 2017 (www.sears.com/downlite-dream-naturally-300-thread-countwool/)-000000000000000205710000000000000362141P?plpSellerId=Overstock.com&prdNo=12&blockNo=12&blockType=G 12) (4 pages).
Organic Wool Toddler Pillow, All Natural &100% Gots Certified Pure Organic, Wool 'Pearls' accessed Jul. 13, 2017 (https://www.amazon.com/Organic-Certified-Antibacterial-Hypoallergenic-Toddlers/dp/B00P6SKT7K) (2 pages).
700 Fill Power Temperature Regulating Down Comforter accessed Jul. 13, 2017 (https://www.cuddledown.com/itemdy00.aspx?ID=70,3276&T1=Z1087+100+10+01) (12 pages).
Hobbs WL90 Count Batting Heirloom Wool, 90" ×" accessed Jul. 13, 2017 (https://www.amazon.com/Hobbs-WL90-Count-Batting-Heirloom/dp/B0063G013G/ref=sr_1_9?e=UTF8&qid=1497374885&sr=8-9&keywords=wool+batting) (1 page).
10" Sewn-Thru Boxstitch PrimaSera Down Alternative Duvet Insert, Tc 230 accessed Jul. 13, 2017 (http://hotelsuppliesdepot.com/10-Sewn-Thm-Boxstitch-PrimaSera-Down-Alternative-DUVET-INSERTTc-230-j 409. html) (1 page).
Badenia 3649730149 Bettcomfort Steppbett, 4-Jahreszeiten, Micro Thermo, 155 × 220 cm, weiB accessed Jul. 13, 2017 (https://www.amazon.de/Badenia-Bettcomfort-03649730149^-Jahreszeiten-Steppbett-Thermo/dp/B0026IBFN0/ ef=sr_1_5?=kitchen&ie=UTF8&qid=1460493398&sr=1-5) (1 page).
Ruffler Urban Sprawl http://www.rufrwear.com/Urban-Sprawl-Plush-Dog-Bed?sc=2&category=17), accessed Sep. 16, 2016 (2 pages).
Office Action and Search Report for China Patent Application No. 201580019495.5 (dated May 3, 2018) (12 pages).
Design Within Reach, Min Bed, http://www.dwr.com/bedroom-beds/min-bed/6348.html?lang=en_US) (accessed May 23, 2018) (19 pages).
Extended European Search Report issued in EP18192998.5, dated Nov. 20, 2018, 8 pages.
How to set up your dog mattress, no date available (1 page).
Amazon Basics Padded Pet Bolster Bed (https://www.amazon.ram/AmazonBas^ 20bed&qid=1459134598&ref =sr 1 11&refinements=p n feature keywords two browse-bin%3A8002501011% 7C8002502011 %7C8002503011 &s=pet-supplies&sr=1 -11), accessed Sep. 16, 2016 (6 pages).
PetCo Sweet Dreams Rectangular Bolster Dog Bed http://www.petco.com/shop/en/pet(X)store/dog/dog-beds-an^ log-bed), accessed Sep. 16, 2016 (2 pages).
Bowsers Urban Lounger (http://www.bowsers.com/pet-beds/urban-lounger/urban-lounger-everest.html), accessed Sep. 16, 2016 (1 page).
Howlpot My Territory (http://www.howlpot.com/product/detail.html?product_no=30&cate_no=1&display_group=2), accessed Sep. 16, 2016 (9 pages).
Office Action dated Mar. 20, 2019 for U.S. Appl. No. 15/611,902 (pp. 1-16).
International Search Report and Written Opinion for PCT/US18/46573 dated Oct. 22, 2018, 23 pages.

\* cited by examiner

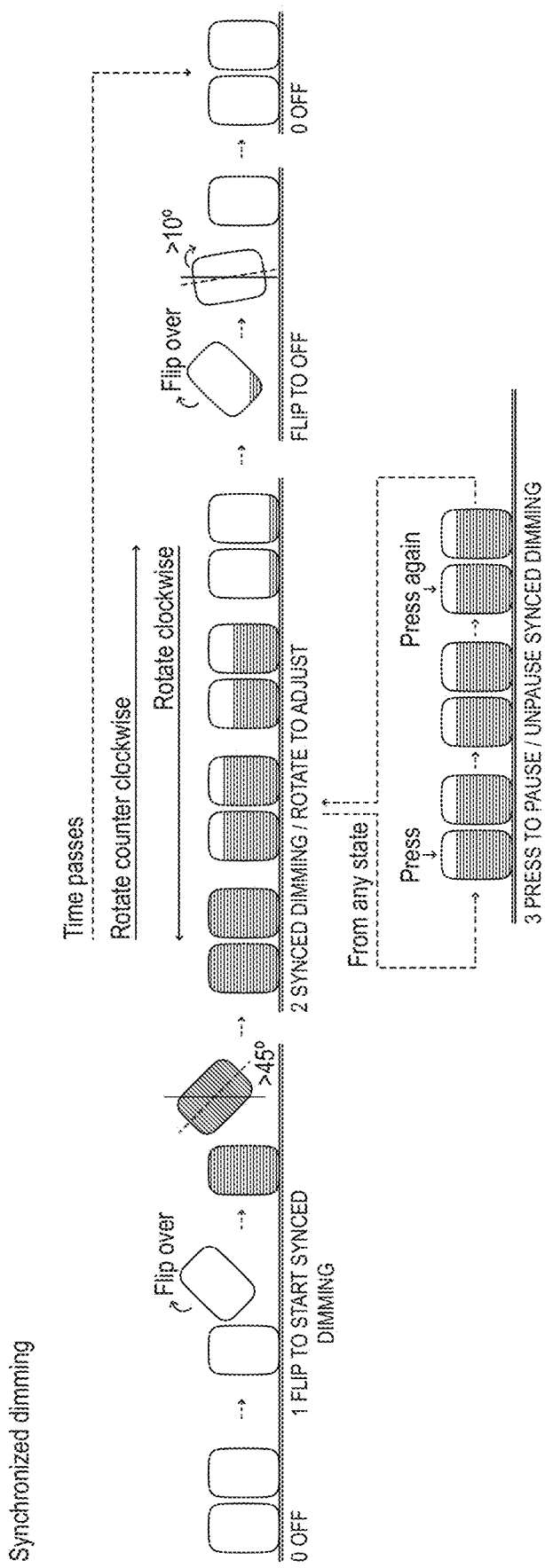

Float | overview

Behaviour

- Light gravitates to the side closest to the ground
- Maintain light output when entering float
- Maintain light fill level when entering float
- Gentle transition colour entering float
- Continue to dim or wake up during float
- Continue to take input from group (pause, rotate, off etc)

Temporary unlink / relink | enter and exit

| | Flip | Remote (Re.) Flip | Long Press | Re. Long Press |
|---|---|---|---|---|
| Off, not part of a group | Turns on | | | |
| Off, part of a group | Turns on along with the rest of the group | Turns on along with the rest of the group | | |
| On, not part of a group (or in solo drift) | Turns off | | | |
| In synchronized dimming or wake up | Turns off along with rest of the group | Turns off along with rest of the group | Temp. unlinks from group - doesn't receive rotate, pause or flip triggers from the group. - doesn't send rotate, pause or flip triggers to the group | |
| On, temporarily unlinked | Turns off - rest of the group stays on - goes back to being linked - next time it's flipped on, it behaves as part of the group again | | Relinks: links back up with the group. Matches the brightness of the rest of the group when an adjustment is made to one of the lights | |

▨ No result, ignore event

*FIG. 9*

Temporary unlink / relink

| | Flip | Remote (Re.) Flip | Wiggle | Re. Wiggle | Short Press | Re. Short Press | Long Press | Re. Long Press |
|---|---|---|---|---|---|---|---|---|
| Temp. unlinked dimming | Turns off | | | | Pauses dimming, pulses up and down | | Relinks with group, matches brightness of the group | |
| Temp. unlinked waking up | Turns off | | | | Pauses wake up, pulses up and down | | Relinks with group, matches brightness of the group | |
| Temp. unlinked paused | Turns off | | | | Unpauses dimming, pulses up and down | | Relinks with group, matches brightness of the group | |

No result, ignore event

*FIG. 10(a)*

| Temporary unlink / relink | Reboot | Re. Reset | Factory Reset | Re. Factory Reset | Press and Hold | Re. Press and Hold | | |
|---|---|---|---|---|---|---|---|---|
| Temp. unlinked dimming | Device reboots, light fills up and goes back down to indicate reboot | | Device factory resets, light fills up and goes back down to indicate reboot | | Powers off | | | |
| Temp. unlinked waking up | Device reboots, light fills up and goes back down to indicate reboot | | Device factory resets, light fills up and goes back down to indicate reboot | | Powers off | | | |
| Temp. unlinked paused | Device reboots, light fills up and goes back down to indicate reboot | | Device factory resets, light fills up and goes back down to indicate reboot | | Powers off | | | |

▨ No result, ignore event

FIG. 10(c)

| Wake up \| enter and exit | Flip | Remote (Re.) Flip | 30 minutes before scheduled time | New wake-up time set within 30min of now |
|---|---|---|---|---|
| Off, Scheduled to wake up | Turns on | Turns on | Starts waking up | Starts waking up, takes current time as the beginning of wake-up cycle. Wake up at the accurate time next time around |
| Dimming, Scheduled to wake up | Turns off | Turns off | Ignores wake up because it's already on | Ignores wake up because it's already on |
| Waking up alone | Turns off | Turns off, starts sync dimming with the rest of the group | n/a | Ignores wake up because it's already on, saves new setting for next time |
| Waking up in sync with another light | Turns off lights that are waking up in sync | Turns off lights that are waking up in sync if the remote flip comes from one of those lights | n/a | Ignores wake up because it's already on, saves new setting for next time |
| Waking up while another light in the group is waking up on a different schedule | Turns off | Turns on, starts sync dimming with the rest of the group if remote flip comes from one of the other lights in the group | n/a | Ignores wake up because it's already on, saves new setting for next time |

*FIG. 12*

Wake up

| | Flip | Remote (Re.) Flip | Wiggle | Re. Wiggle | Short Press | Re. Short Press | Long Press | Re. Long Press |
|---|---|---|---|---|---|---|---|---|
| Single light waking up | Turns off | Turns on, starts sync dimming with the rest of the group | | | Pauses wake up, pulses up and down | n/a | | |
| Multiple lights waking up together | Turns off | Turns on, starts dimming drift with the rest of the group if the remote flip is from a light that wasn't waking up | | | Pauses wake up on all lights waking up together, all affected lights pulse up and down | Pauses wake up on all lights waking up together, all affected lights pulse up and down | Temporary unlinks the light that was touched, the light pulses up and down on the affected light | |
| Multiple lights waking up on different schedules | Turns off | Turns on, starts sync dimming with the rest of the group | | | Pauses wake up on the light that was touched, pulses up and down | n/a | | n/a |

*FIG. 13(a)*

| Wake up | | Rotate CW | Re. Rotate CW | Rotate CCW | Re. Rotate CCW |
|---|---|---|---|---|---|
| | Single light waking up | Gets brighter and fills more of the light, continues to wake up | n/a | Gets dimmer and fills more of the light, continues to wake up | n/a |
| | Multiple lights waking up together | All lights that are waking up together get brighter and fill more of the light, they continue to wake up | All lights that are waking up together get brighter and fill more of the light, they continue to wake up | All lights that are rising together get dimmer and fill less of the light, they continue to wake up | All lights that are waking up together get dimmer and fill less of the light, they continue to wake up |
| | Multiple lights waking up on different schedules | Gets brighter and fills more of the light, continues to wake up | n/a | Gets dimmer and fills more of the light, continues to wake up | n/a |

FIG. 13(b)

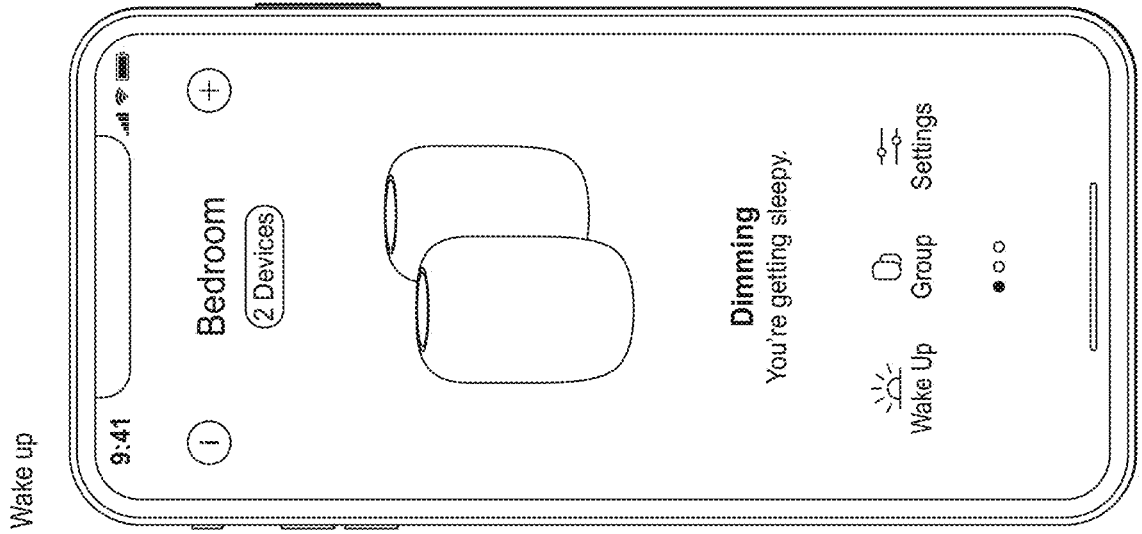
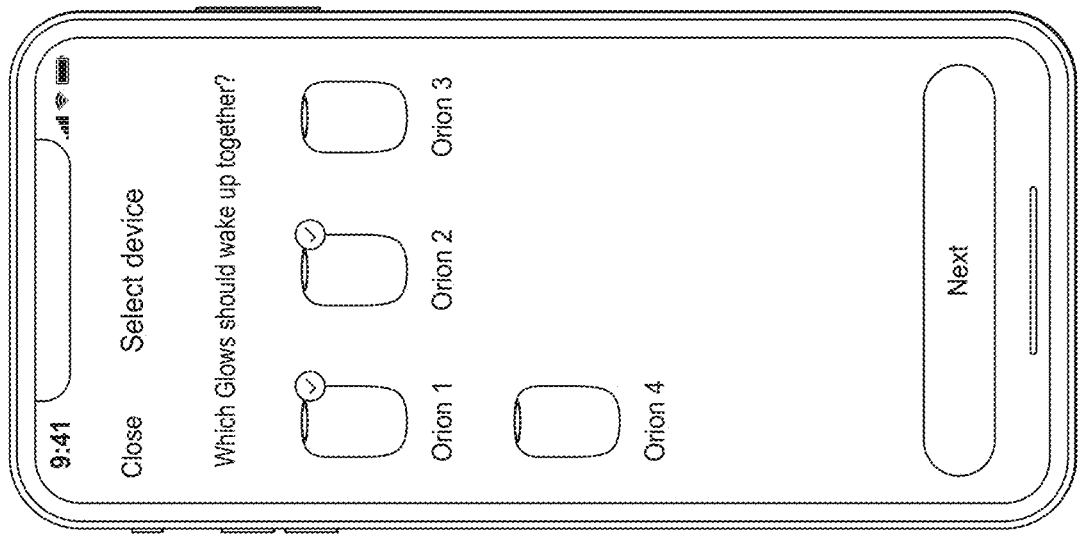
FIG. 14

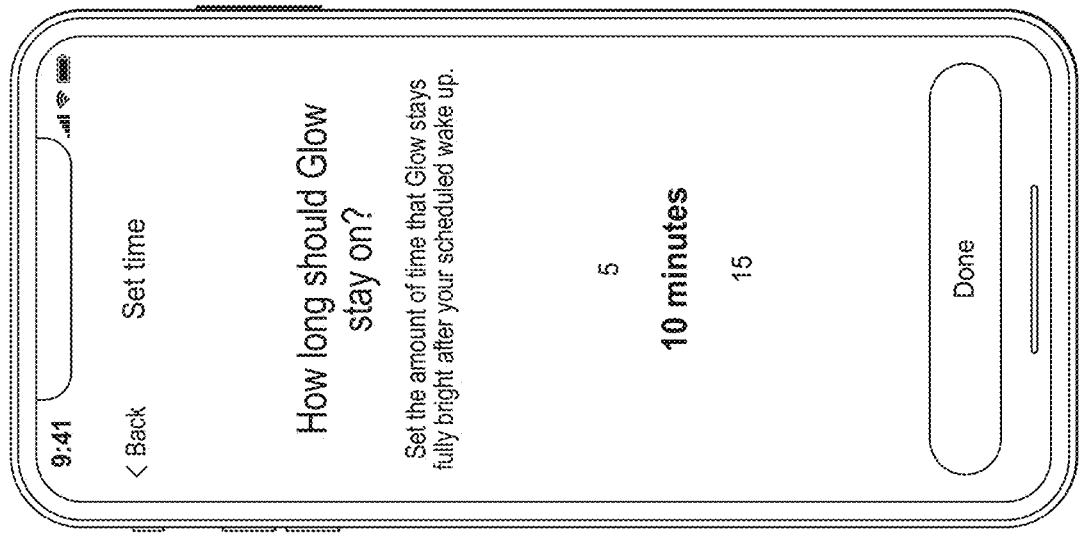
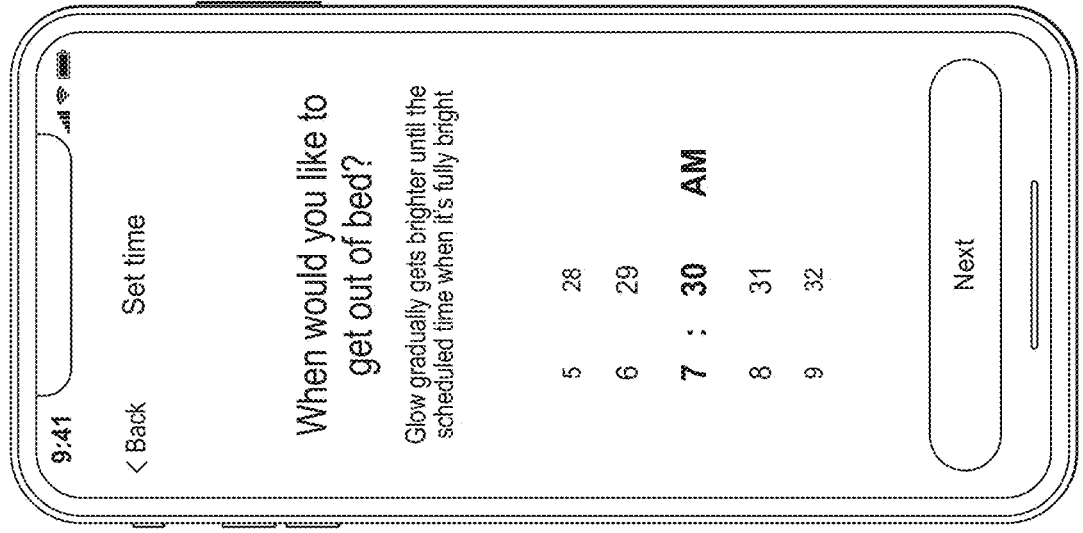
FIG. 14 Cont'd

Wake up | group behaviour at overlapping wake-up times

| | Group of lights... | Scheduled Wake-up 1 | Scheduled Wake-up 2 | Scheduled Wake-up 3 | Example | Behaviour when waking up, lights are flipped, paused, rotated |
|---|---|---|---|---|---|---|
| All lights scheduled to wake-up together | 2-6 | All Lights<br>Selected all lights in the group during "set wake-up" flow | n/a | n/a | All lights:<br>7:30am, 10min linger | Synchronized |
| All lights scheduled to wake-up individually | 2-6 | Single Light<br>Selected a single light during "set wake-up" flow | Single Light<br>Selected a single light during "set wake-up" flow | Single Light<br>Selected a single light during "set wake-up" flow | One light:<br>11:30am, 10min linger<br>Another light:<br>5:30am, 30min linger<br>Another light:<br>9:30am, 10min linger | Independent |
| Some of lights scheduled to wake-up together | 3-6 | Some Lights<br>Selected a subset of lights during "set wake-up" flow | n/a | n/a | 2 lights:<br>7:30am, 10min linger<br>1 light:<br>No wake-up setting | Synchronized Subset<br>Only the lights that are waking up are synced |
| Some of lights scheduled to wake-up together, some lights scheduled to wake-up individually | 3-6 | Some Lights<br>Selected a subset of lights during "set wake-up" flow | Single Light<br>Selected a single light during "set wake-up" flow | Single Light<br>Selected a single light during "set wake-up" flow | 2 lights:<br>7:30am, 10min linger<br>1 light:<br>7:45am, 10min linger<br>1 light:<br>8:00am, 10min linger | Synchronized Subset + Independent<br>Only the lights that are set to wake-up together are synced, the others are independent |

FIG. 15(a)

Wake up | group behaviour at overlapping wake-up times

| | Group of lights... | Scheduled Wake-up 1 | Scheduled Wake-up 2 | Scheduled Wake-up 3 | Example | Behaviour when waking up, lights are flipped, paused, rotated |
|---|---|---|---|---|---|---|
| Scheduled to wake-up at the same time but individually | 2-6 | Single Light<br><br>Selected a single light during "set wake-up" flow | Single Light<br><br>Selected a single light during "set wake-up" flow | Single Light<br><br>Selected a single light during "set wake-up" flow | All lights:<br>7:30am, 10min linger<br><br>Or<br><br>One light:<br>7:30am, 10min linger<br>Another light:<br>7:30am, 30min linger | Independent |
| Some of lights scheduled to wake-up together overlapping with other lights in the group scheduled to wake up together | 4-6 | Some Lights<br><br>Selected a subset of lights during "set wake-up" flow | Some Lights<br><br>Selected a subset of lights during "set wake-up" flow | n/a | 2 lights:<br>7:30am, 10min linger<br>3 light:<br>7:00am, 30min linger | False Synchronized |

FIG. 15(b)

Battery details | charging

| % | State | App Indication | Performance | Light Behaviour |
|---|---|---|---|---|
| 100% | | [green lightning bolt] Battery Full | | |
| | Charging Sufficient Battery | [green lightning bolt] Battery Charging | | Light behaves according to normal UX. Maintains connections to group and app |
| 51% | | [yellow lightning bolt] Battery Charging | | |
| 20% | Charging Low Battery | [red lightning bolt] Battery Charging | | Light behaves according to normal UX while on charger. Maintains connections to group and app |
| 15% | Charging Battery trap / Insufficient Battery | [red lightning bolt] Battery Charging | | Light behaves according to normal UX while on charger. Maintains connections to group and app |
| 5% | RTC reserve / Hibernate | | | Light is unresponsive until it's out of hibernate, no connections maintained |
| 0% | Undervoltage | | | |
| | Not charging | [Gray lightning bolt] Battery Not Charging | Battery might go into this state due to overheating or some other problem | |

*FIG. 18*

Low battery | state table 2/2

| | Rotate CW | Re. Rotate CW | Rotate CCW | Re. Rotate CCW | Reboot | Factory Reset | Press and Hold |
|---|---|---|---|---|---|---|---|
| Low battery in standby | | | | | | | |
| Low battery dimming or waking up | 1. Gets brighter 2. Bottom accent LEDs pulse 3 times | 1. Gets brighter 2. Bottom accent LEDs pulse 3 times | 1. Gets dimmer 2. Bottom accent LEDs pulse 3 times | 1. Gets dimmer 2. Bottom accent LEDs pulse 3 times | Device reboots | Device factory resets | Powers off |
| Low battery paused (drift or wake up) | 1. Gets brighter 2. Pause pulse 3. Bottom accent LEDs pulse 3 times | 1. Gets brighter 2. Pause pulse 3. Bottom accent LEDs pulse 3 times | 1. Gets dimmer 2. Pause pulse 3. Bottom accent LEDs pulse 3 times | 1. Gets dimmer 2. Pause pulse 3. Bottom accent LEDs pulse 3 times | Device reboots | Device factory resets | Powers off |
| Low battery in float | | 1. Gets brighter 2. Downward facing accent LEDs pulse 3 times | | 1. Gets dimmer 2. Downward facing accent LEDs pulse 3 times | Device reboots | Device factory resets | Powers off |
| Low battery paused float (drift or wake up) | | 1. Gets brighter 2. Pause pulse 3. Downward facing accent LEDs pulse 3 times | | 1. Gets dimmer 2. Pause pulse 3. Downward facing accent LEDs pulse 3 times | Device reboots | Device factory resets | Powers off |

 No result, ignore event

FIG. 19(b)

Power on/off | enter and exit

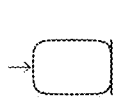
6 sec. press

| | | 6 sec. press |
|---|---|---|
| ☐ | Idle | Powers light off. At the end of 6 seconds (While the button is still depressed) light animates and turns off. Same animation as "nod". |
| ☐ | On (dimming, paused or waking up) | Powers light off. At the end of 3 seconds light pulses for temporary unlink, at the end of 6 seconds (while the button is still depressed) light turns off. |
| ☐ | Powered off (in lockout or ship mode) | Powers light on. At the end of 6 seconds (While the button is still depressed) light fills up and drains over 2 seconds. |
| ☐ | In hibernate | ▨ |
| ◈ | Floating | Powers light off. At the end of 3 seconds light pulses for temporary unlink, at the end of 6 seconds (while the button is still depressed) light turns off |
| ◇ | Non-vertical idle | Powers light off. At the end of 6 seconds (While the button is still depressed) light animates and turns off. Same animation as "nod". |

▨ No result, ignore event

*FIG. 20*

INTERACTIVE PORTABLE LIGHTING SYSTEM

REFERENCE TO PRIOR APPLICATIONS

This application claims the benefit of the following two applications, each of which is hereby incorporated by reference in its entirety:
1) U.S. Provisional Application Ser. No. 62/614,997 filed on Jan. 8, 2018; and
2) U.S. Provisional Application Ser. No. 62/730,527 filed on Sep. 12, 2018.

FIELD OF THE DISCLOSURE

The present invention relates to an improved interactive portable lighting system.

BACKGROUND

Lighting in a bedroom environment can prevent a person from going to sleep. Thus, the process of going to sleep may be improved by adjusting lighting in a dynamic manner.

Accordingly, there is a need for a lighting device or devices to deliver soothing lighting during the bedtime routine.

There is also a need for a lighting device or devices whose tone and brightness are tuned for sleep. For example, as the lighting device gets dimmer, tone of its emitted light gets warmer (more yellow).

In addition, existing lighting devices are not designed to be controlled by physical motion, such as by manual manipulation. Thus, there is also a need for a lighting device or devices that are easy to control and operate by hand manipulations.

There is also a need for a lighting device or devices that operate on rechargeable batteries, where battery charging itself could be contactless, such as by induction charging.

There is also a need for lighting devices that, when operated as a group, match each other, i.e., synchronize, and operate in unison.

There is also a need for a lighting device or devices that can be integrated and can be made to communicate wirelessly with other wireless products, including smart products.

These goals may be accomplished by a group of one or more interactive mood lighting devices designed to put the perfect soothing lighting for sleep at a user's fingertips and keep disruptive light out of bedtime. This includes gestural (physical motion) control of light and unification of all distributed lights.

SUMMARY

The present invention involves a lighting system that may have the following features:
(1) Guides people to sleep with lighting by:
 (a) Dimming:
  (i) light slowly gets dimmer as the evening winds down;
  (ii) enabling lamps(s) to dim to "off" over a set duration;
 (b) Waking up:
  (i) light slowly gets brighter to wake up a person;
  (ii) enabling lamps(s) to reach full brightness on a set schedule;
 (c) Optimized lighting, such as by having tone and brightness tuned for sleep. For example, by having light get warmer in tone as it gets dimmer.
(2) Providing a unique and wondrous user experience via:
 (a) Gestural Controls:
  (i) turning on a light through physical manipulation, such as by
  (ii) animating light through physical motion, where the light intuitively responds to gestures (hand manipulations) like tilt, flip, wiggle, rotate, etc.
(3) Provides for a Distributed/Unified light that is:
 (a) battery powered with contact charging base, where the batteries can last one week (or other duration) of regular use on a single charge;
 (b) unified, such as by having wireless connectivity so that the individual lights are in unison. For example, when "on," all grouped lights match each other;
 (c) integrated with other devices. For example, the lighting system of the present invention communicates with other products and other smart devices (e.g., Nest, Echo, Hue, etc.);
 (d) allows lights to be controlled in real time, as well as being programmed, remotely, such as via an app on a mobile device.
(4) Provides light on demand:
 (a) low impact wiggle to turn-on light, making it portable and ready for nighttime excursions.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention and explain various principles and advantages of those embodiments.

FIGS. 4(a) and 4(b) depict state diagrams of device operation and interactions in a group of two or more linked lamps in accordance with some embodiments of the present invention.

FIG. 9 discloses an event table for temporary unlinking and relinking of a lamp in accordance with some embodiments of the present invention.

FIGS. 10(a), 10(b), and 10(c) provide a state table disclosing what happens to a temporarily unlinked device when another operational event occurs in accordance with some embodiments of the present invention.

FIG. 12 provides an event table disclosing what happens to a device that is programmed to wake up when another control signal is received in accordance with some embodiments of the present invention.

FIGS. 13(a) and 13(b) provide a state table for a wake-up feature in accordance with some embodiments of the present invention.

FIG. 14 shows sample display screens appearing on a mobile device when an app is used to program a wake-up feature in accordance with some embodiments of the present invention.

FIGS. 15(a) and 15(b) show behavior of a multi-lamp system with programmed overlapping wake-up times in accordance with some embodiments of the present invention.

FIG. 18 discloses system performance, light behavior, and app indication when the battery is charging in accordance with some embodiments of the present invention.

FIGS. 19(a) and 19(b) show a state table disclosing what happens to a device with a low battery when another control signal is received in accordance with some embodiments of the present invention.

FIG. 20 illustrates system behavior when a lamp's button is pressed for a very long period, e.g., more than 6 seconds, while the lamp is in various operating modes in accordance with some embodiments of the present invention.

Figure 1A:
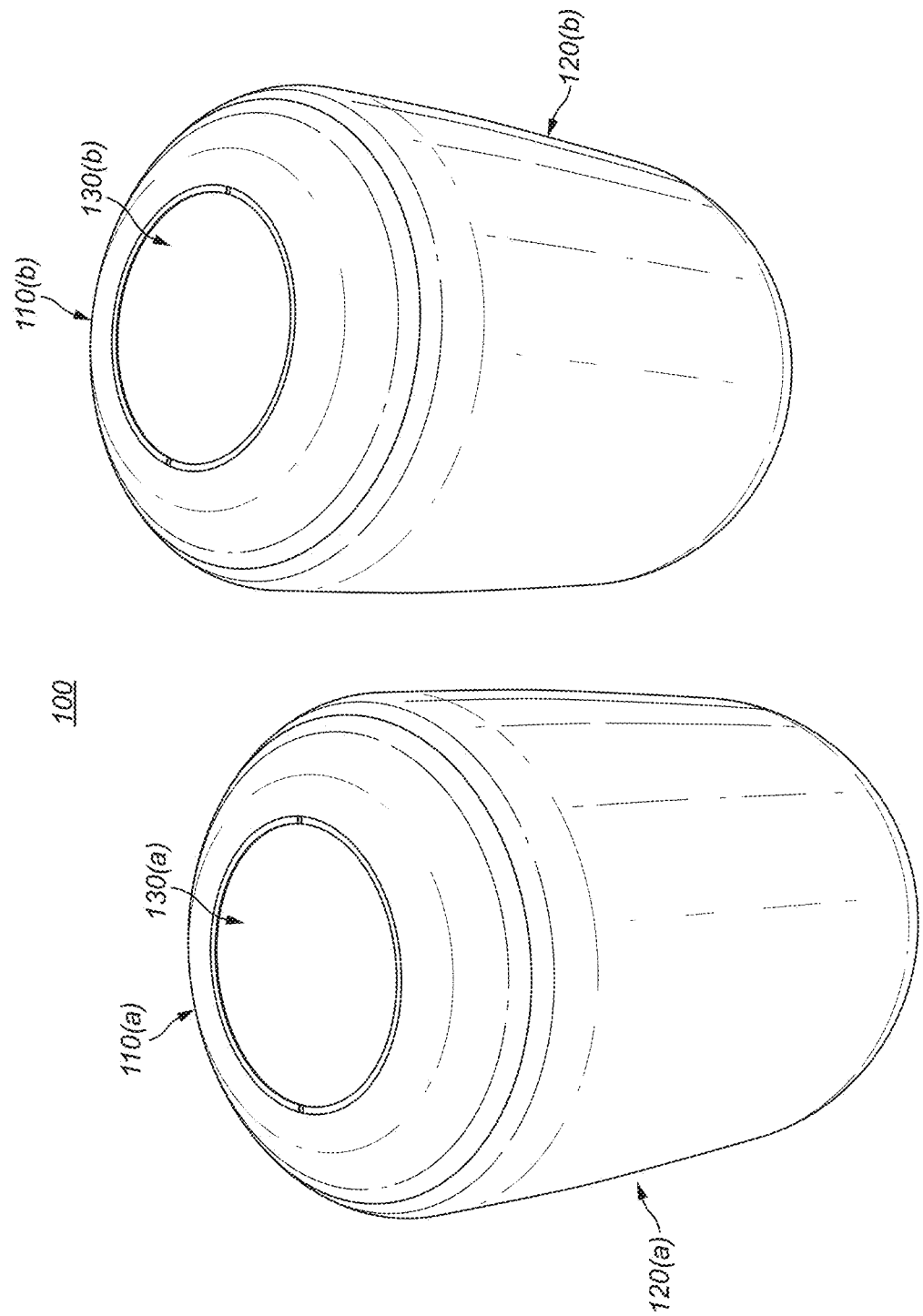
FIGS. 1(a) and 1(b) is a view of a lighting system in accordance with some embodiments of the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

The following detailed description discloses some embodiments of the interactive lighting system of the present invention, including a group of one or more interactive mood lights designed to put the perfect soothing lighting for sleep at a user's fingertips and keep disruptive light out of bedtime. This includes gestural (physical manipulation) control of light and unification of all distributed lights (lamps).

Figure 1B:
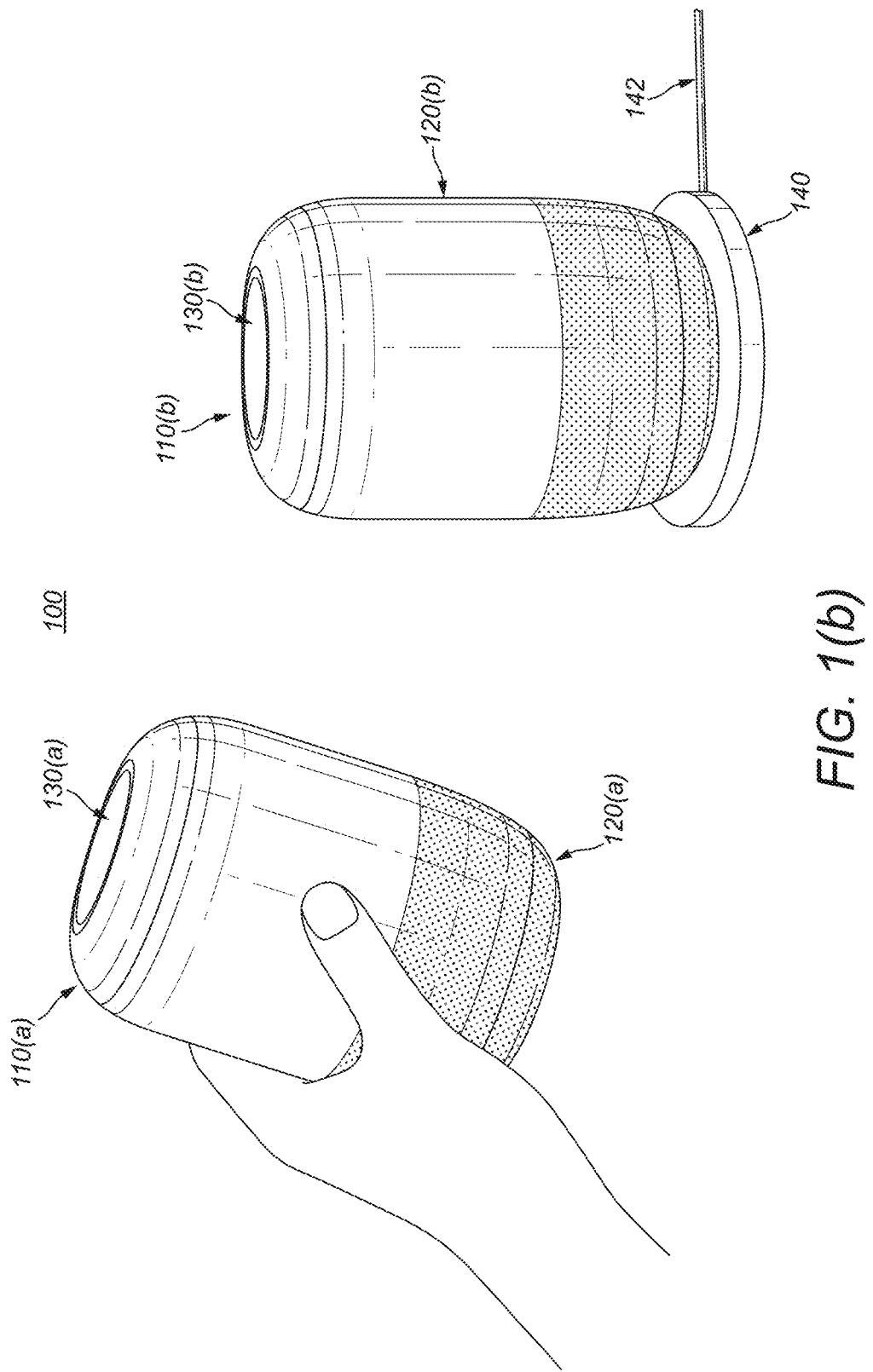

FIGS. 1(a) and 1(b) show a lighting system 100 in accordance with some embodiments of the invention. The lighting system 100 includes a group of two lamps, 110(a) and 110(b), that can be operated individually or in unison. Each of the lamps includes a translucent shell 120 and two buttons 130, one on each end of the lamp (the button on the lower end of each lamp is not shown). In one embodiment, the translucent shell 120 is smooth, scratch-resistant, matte, and milky. Each of the two buttons 130 on any individual lamp is smooth, scratch-resistant, matte, and opaque. In an alternative embodiment, the buttons 130 can be replaced by known touch activated switches, such as capacitive or optical sensors, or by voice activated sensors.

FIG. 1(b) shows the lighting system of FIG. 1(a) in operation, where the lamps are providing illumination (lower half of each lamp in FIG. 1(b) appears lit), with one of the lamps being held and/or manipulated by a user. FIG. 1(b) also depicts a lamp charger (charging base) 140, with a power cable 142, and a lamp placed on it. In one embodiment, the charging base is shaped like a hockey puck. While FIG. 1(b) depicts only one charging base, the number of charging bases in the system is not limited. For example, each lamp can have its own charging base.

Figure 2:
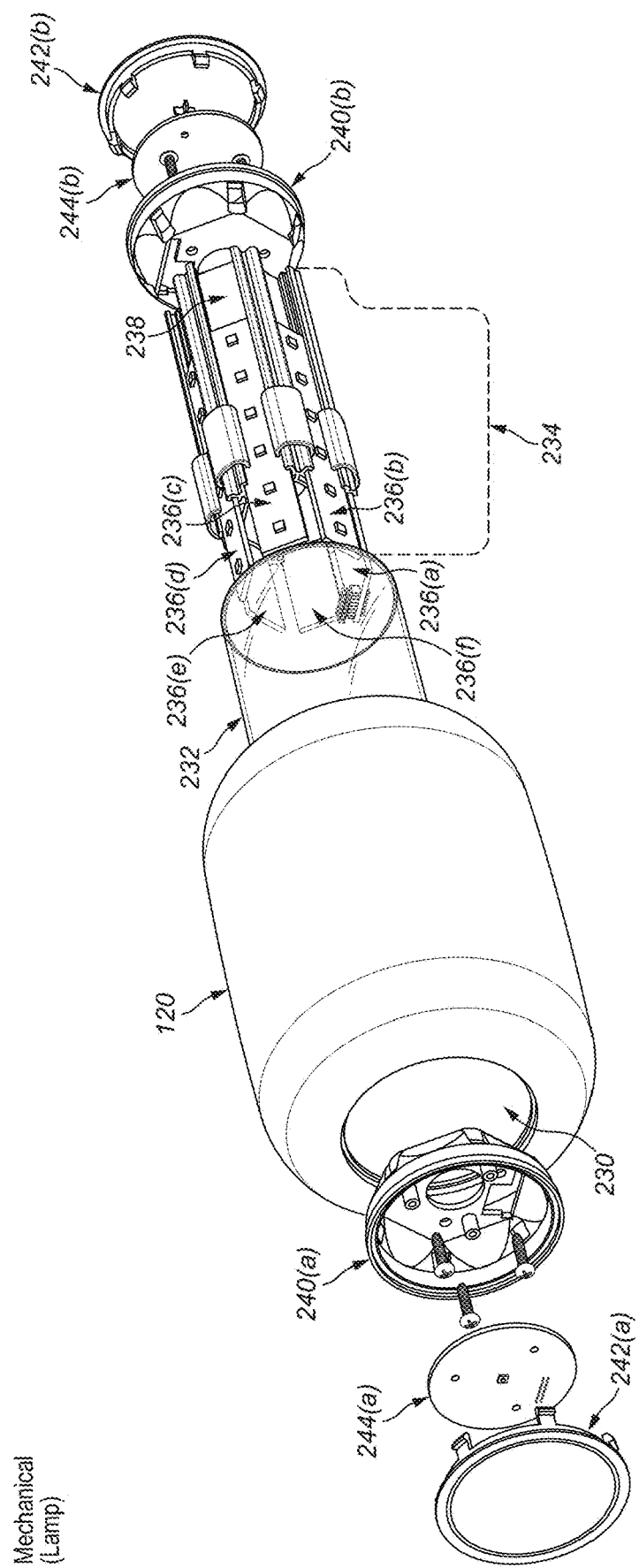
FIG. 2 illustrates a mechanical assembly of the individual lamps in FIGS. 1(a) and 1(b) in accordance with some embodiments of the present invention.

MECHANICAL ASSEMBLY: FIG. 2 illustrates a mechanical assembly of the individual lamps in FIGS. 1(a) and 1(b) in accordance with some embodiments of the present invention. The mechanical assembly includes a hollow translucent shell 120 having an opening 230 at both ends. The shell can be made out of polycarbonate or such other material as copolyester, and fabricated by blow molding and/or computer numerical control ("CNC") process known in the art. Other materials and manufacturing processes know in the art could also be used. A tubular light-diffuser 232, which is optional, is placed inside the shell 120. In one embodiment, the diffuser 232 is a polycarbonate extrusion. A light emitting diode ("LED") assembly 234 is placed inside the diffuser 232. The LED assembly 234 includes six printed circuit boards 236 ("LED PCBs" or "LED boards"), with multiple LEDs on each LED board, installed around a perimeter of a hollow extruded aluminum core 238. (FIG. 2 shows three LED boards from their front and three from the back.) A rechargeable battery (not shown in the figure) is located inside the center opening in the core.

End caps 240(a) and 240(b) fit within the two openings 230 in the shell 120 and are coupled to each end of the LED assembly 234. A button 242(a) and its associated button-PCB 244(a) for sensing the button press are installed over the end cap 240(a), and another button 242(b) and its associated button-PCB 244(b), are installed over the end cap 240(b) at the other end of the lamp. (Buttons 242(a) and 242(b) in FIG. 2 correspond to the two buttons 130, one on each end of each lamp, as disclosed above concerning FIG. 1.) In one embodiment, in addition to sensing a button press, one of the two button-PCBs also includes electronics for controlling functionality of the lamp. In FIG. 2, the button-PCB 244(a) includes such electronics and is identified as a "Main PCB." The electrical-contact rings on each end cap allow for recharging the battery independent of the lamp's upside-down orientation. In one embodiment, the charging rings receive power via spring loaded pogo pins in the charging base 140. In an alternative embodiment, charging could be accomplished by inductive coupling, without the external contact rings. In addition, the buttons 242(a) and 242(b) could be implemented as either capacitive or optical contact-sensors, or as non-contact, e.g., voice activated, sensors.

Figure 3:
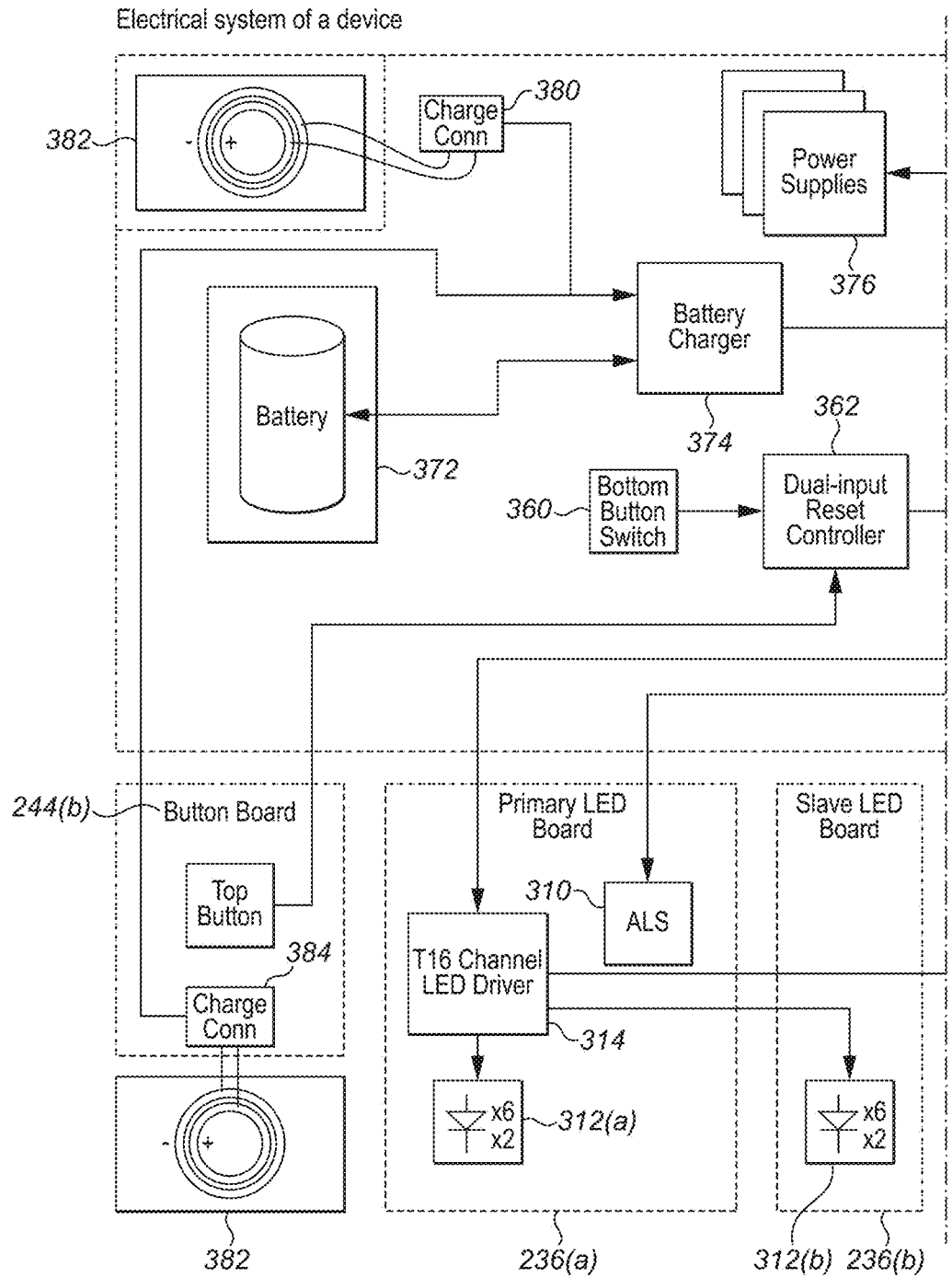
FIG. 3 is a block diagram of an electrical system of the individual lamps in accordance with some embodiments of the present invention.
Figure 3:
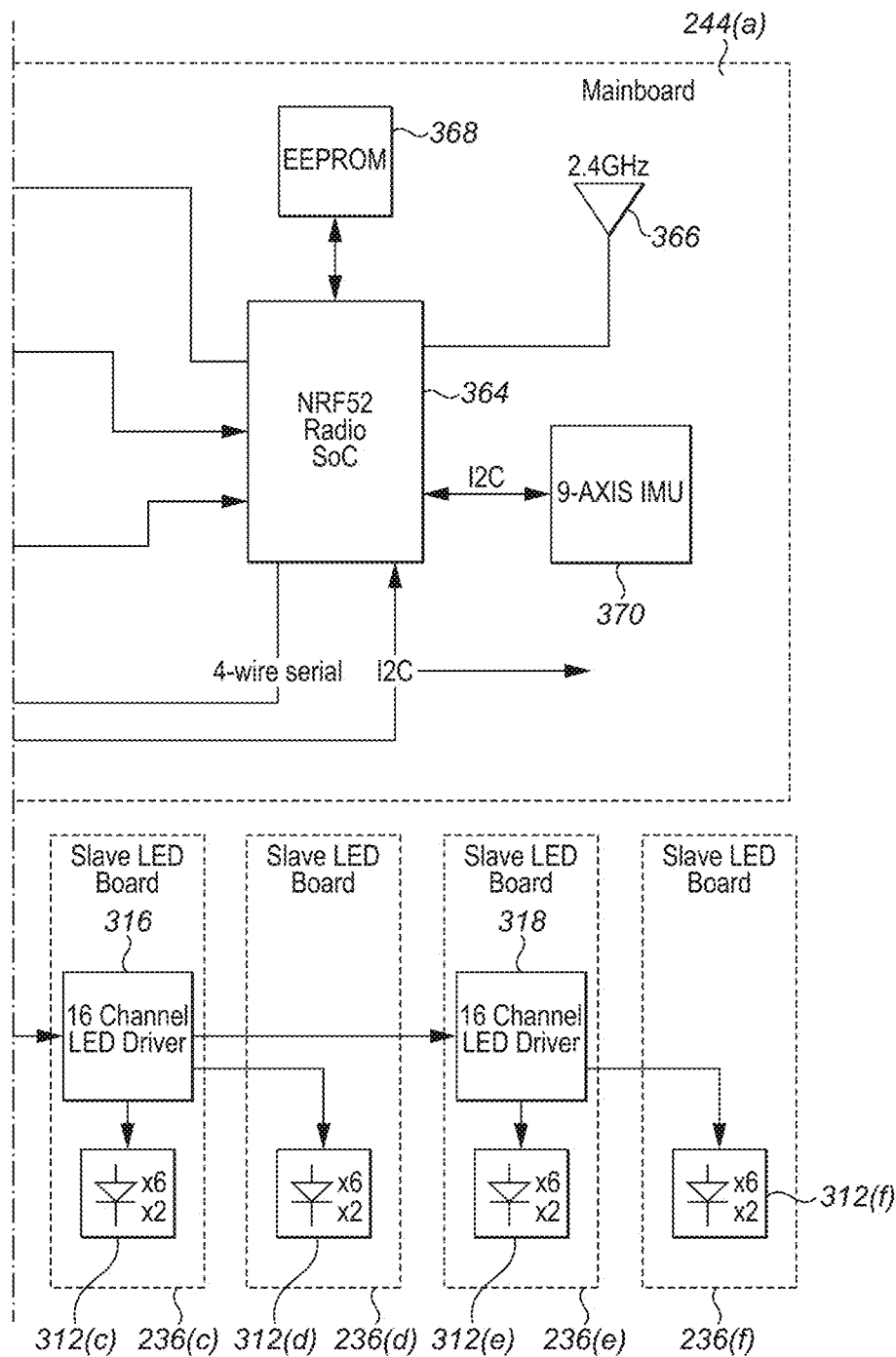

ELECTRICAL SYSTEM: FIG. 3 shows a block diagram of an electrical system of an individual lamp in accordance with some embodiments of the present invention. FIG. 3 depicts a "Main PCB" (Main Board) 244(a), a button-PCB 244(b), and the six LED PCBs (LED boards) 236(a)-(f), as well as their respective interconnections. The LED board 236(a) includes an ambient light sensor ("ALS") 310, is connected to the Main-PCB 244(a), and is also coupled to the other five LED boards. As a result, the LED board 236(a) is called the Primary LED Board, while each of the remaining five LED boards is called a Slave LED Board.

The Main Board 244(a) includes a bottom-button switch 360 that is activated by the button 242(a). The switch 360 feeds one of two inputs of a Dual-input Reset Controller block 362, which in turn feeds a main processing and control 364 block. In one embodiment, the main processing and control block 364 is implemented in a Nordic Semiconductor NRF52 System on a Chip ("SoC"), which includes a 2.4 GHz Bluetooth™ radio. Antenna 366 is connected to the main processing and control block 364 and allows the lamp to wirelessly communicate with other lamps and other wireless products.

A memory block 368, which in one embodiment is an Electrically Erasable Programmable Read Only Memory ("EEPROM"), is also interconnected with the block 364. Block 370 measures a change in spatial orientation of the lamp in the x-y-z plane and is also coupled to the main processor and control block 364. For example, block 370 measures such changes in the lamp's spatial orientation as movement and rotation of the lamp with respect to the "y" axis, as well as changes with respect to other axes and planes. In one embodiment, block 370 is a 9-axis internal measurement unit ("9 DOF IMU"), also known in the art as a 9 degrees-of-freedom internal measurement unit, that communicates with block 364 over a bi-directional two-wire communication interface known as the Inter-Integrated Circuit ("I²C") interface.

Device power comes from a rechargeable battery 372, which is coupled to block 364 via a battery charger 374. Block 364 receives power input from the battery and controls one or more power supplies 376, which in turn are used to provide regulated power to the different circuits inside the lamp. A charging connector 380 on the Main Board 244(a) provides interconnection between the battery charger 374 and an external charging base 382, illustrated as reference number 140 in FIG. 1(b), in one vertical orientation. A similar charging connector 384 on the Button Board 244(b) provides interconnection between the battery charger 374 and the external charging base 382 when the lamp is flipped upside-down.

Each of the six LED boards, 236(a)-(f), includes eight LEDs, six white and two red. The white LEDs are used for illumination and the red LEDs are primarily used for varying the overall tone of the visible light projected outside the lamp. The LEDs can also be used for indicating device status to the user, e.g., battery low/needs charging, dimming function is paused, identifying the lamps when grouping them in the app, etc. Such indications can be done by the LEDs pulsing, steady on, etc. Each of the two Slave LED boards 236(c) and 236(e) and the Primary LED board 236(a) also includes 16 Channel LED Driver block, designated in FIG. 3 by reference numerals 316, 318, and 314, respectively. The 16-Channel LED Driver 314 on the Primary LED Board can drive the LEDs on the Primary LED Board 236(a) and on the Slave LED Board 236(b). The 16-Channel LED Driver 316 can drive the LEDs on its Slave LED Board 236(c) and on the Slave LED board 236(d). The 16-Channel LED Driver 318 can drive the LEDs on its Slave LED Board 236(e) and on the Slave LED Board 236(f). The main processor and control block 364, on the Main Board 244(a), communicates with an ambient light sensor ("ALS") 310 on the Primary LED Board 236(a) via an I²C interface. Block 364 also controls the LEDs on the six LED boards via a 4-wire interface to the 16 Channel LED Driver 314 on the Primary LED board 236(a).

Physical interconnections between the different circuit boards may be accomplished by flexible printed circuits.

While FIG. 3 illustrates one embodiment of the electrical system of the present invention, other configurations of the electrical system, such as those disclosed in the U.S. provisional applications 62/614,997 and 62/730,527, each of which has been incorporated by reference in its entirety in the present application, are within the scope of the invention. Accordingly, other configurations, interconnections, interfaces, circuits, and communication protocols, including wireless communications protocols, can be used to implement the present invention.

As described above, the interactive portable lighting system of the present invention includes a group of one or more lamps, e.g., six lamps, where the lamps can be controlled individually or together as a group. When the group is a single lamp, the lamp will respond to manual manipulations, such as a user moving the lamp in the x-y-z plane, as a standalone device. The manipulations could be coupled with timing requirements, such that the same manipulation will be interpreted differently based on its timing and/or sequence of manipulations preceding it.

While the invention is not limited to the specific user actions and device behaviors, the actions and behaviors listed below are presented for the purpose of describing some embodiments of the invented system.

User Actions:

"flip": turning a device upside down;

"wiggle": moving the device back and forth from the vertical axis by a predetermined number of degrees (e.g., up to about 10 degrees)

"rotate": turning a device around a vertical axis;

"button press(es)": pressing the button on top of a device (the device may be symmetrical, so whichever face is up is considered the top). Different combinations of button presses, which can vary in duration and sequence, can be used to control various functions of the system;

In another embodiment, user actions may also include a "lift" action, which corresponds to lifting a device off the surface it has been sitting on.

Device Behaviors:

"dimming": starting at the brightest light level that fills the device and slowly dimming down as the light vertically fills less of the device (in one embodiment, the light also gets warmer (yellow) in color as it gets dimmer);

"wake up": starting in any state, the light slowly fills more of the device as is gets brighter (in one embodiment, the light also gets cooler (bluer) in color as it gets brighter);

"float": at any given level of brightness, tilting the device from vertical in any direction by a predetermined amount (e.g., >10 degrees) causes the light inside to gravitate to the side that is closer to the ground. (In an alternative embodiment, tilting the device in any direction causes the light inside to gravitate to the side that is farther from the ground).

"pulse": at any given state and brightness, the light dims down and back up to indicate an event or action (e.g., charging, linked to other lights, etc.)

"button presses" pressing a button on a device. The number of button presses and their durations could be used alone and in combination to provide system commands.

For example, starting in an "idle" state, in which all of the white LEDs are "off" (i.e., no illumination) but the sensing circuitry inside the lamp is active, when the system detects that the lamp is being flipped, i.e., senses tilting of the lamp by more than a predetermined number of degrees from vertical, for example, more than 135 degrees, the lamp could turn on all of its white LEDs to begin illuminating at full brightness. At the same time, wiggling the lamp, instead of flipping it, could constitute a command to turn "on" the illumination at a low level. When the illumination is not at the full level, only some of the white LEDs on the six LED boards will be "on." In one embodiment, a low-level illumination could start with a white LED on each LED Board that is closest to the ground being "on," and increase by sequentially turning "on" the white LEDs that are farther away from the ground. In another alternative embodiment, a low-level illumination could start with a white LED on each LED board that is the farthest from the ground being "on," and increase by sequentially turning "on" the white LEDs that are closer toward the ground on each LED board. In yet another embodiment, the illumination could start at a low level with a white LED in the middle of each LED board ("middle LED") being "on," and increase by sequentially turning on the white LEDs that are located on either side of the middle LED on each LED board.

If the user turns the lamp "on" at full brightness, all of the white LEDs on the six LED boards are turned "on," the system could initiate a timed dimming to decrease the illumination. When the lamp is illuminating, rotating (turning) the lamp clockwise or counterclockwise around the vertical ("y") axis could constitute a command to increase or decrease the illumination, respectively. To pause the illumination dimming, a user could press either button 242. Pressing the button again will un-pause the dimming. Whether in the pause mode, in the dimming mode, or at any fixed illumination level, if the user flips the lamp, the lamp will turn "off" the illumination and revert back to the "idle" mode.

One embodiment enables the lamp to adjust the tone of the light seen by the user with a change in the brightness level. For example, as the brightness of the lamp is decreased, the tone of the light seen by the use is made warmer. This is accomplished by selectively activating the red LEDs on the LED boards. For example, assuming the vertical orientation shown in FIG. 1(*a*) and lamp on the right side in FIG. 1(*b*), at full brightness, when all six white LEDS on each LED board are turned "on," both red LEDs on each board are turned "off." This will give the illumination a cool tone. At 33% of the full brightness level, for example, e.g., when two of the six white LEDS on each LED Board are "on," one red LED on each board gets turned "on" at a dim level. Mixing of the red and white light coming from the lamp will make the light appear yellowish, which will give the illumination a warm tone. Finally, when the brightness level dims further, for example to around 16%, e.g., when only one of the six white LEDS on each LED Board is "on," one both red LED on each board gets turned "on" brighter, creating an even warmer tone. Such dynamic adjustment of tone improves the process of going to sleep by delivering soothing lighting during a bedtime routine.

In another embodiment, to control tone, both red LEDs on each LED Board could be turned "on" at the same time. Physical location of the red LEDs with respect to the white LEDs on each LED Board could also dictate which red LED is turned "on" for tone control. For example, in one embodiment, when the red LEDs are located on opposite ends of an LED board, the red LED(s) at only one end are turned on, i.e., the red LED(s) at both ends are not turned on at the same time.

In addition to controlling the lamp's overall brightness level by merely turning some LEDs fully "on" while keeping other LEDs fully "off," the lamp's brightness level could further be controlled by pulsing one or more LEDs at a specified duty cycle and at a frequency that is sufficiently high for a human observer not to perceive it as flicker. For example, due to an integrating effect of the human eye, an LED pulsed at 30 Hz at a 50% duty cycle will be perceived as being continuously "on" at a ½ brightness level from the LED's maximum brightness. By controlling a duty cycle of the individual LEDs, the lamp's overall perceived brightness level and its tone level could be varied with a virtually unlimited resolution.

In one embodiment, the lamp is designed to have a "Float" mode, which provides the user with a unique experience. In the Float mode, the lamp's processing and control circuitry dynamically changes which LEDs are "on" depending on the lamp's spatial orientation. For example, assume that the lamp is in vertical orientation shown for both lamps in FIG. 1(*a*) as well as for the lamp on the right in FIG. 1(*b*) and only the lower three of the six LEDs on each LED Board are fully "on" (i.e., the lamp is at half brightness with the light gravitated toward the ground). If the user starts tilting or wiggling the lamp around the vertical ("y") axis by more than a predetermined number of degrees (e.g., 10 degrees), the processing and control circuitry, while maintaining the brightness level, will dynamically control the LEDs to maintain the brightness level while making the light source in the lamp appear to gravitate toward the ground. For example, if the user tilts the lamp by 90 degrees and lays it on a side, the processing and control circuitry, while maintaining the light level, will turn "on" all of the LEDs on the LED boards that are closest to the ground and turn "off" the LEDs that are on the LEDs boards that are farther away from the ground. In one embodiment, when entering Float, the lamp maintains light fill level, and can either maintain tone or gently vary tone.

There could be various ways of entry and exit to and from the Float mode. For example, in one embodiment, Float mode for a lamp can be entered into from "off," when another grouped lamp is tilted or wiggled by more than 10 degrees from vertical. Exiting from the Float mode, for example, could be by: (a) tilting the lamp from vertical by greater than a predetermined number of degrees, e.g., 170; (b) flipping another grouped lamp to "off"; or (c) tilting the lamp back to less than a predetermined number of degrees, e.g., 10 degrees, from vertical.

In terms of behavior, on one embodiment, a lamp in Float mode may also ignore rotation input, provide full pause and temporary unlink functionality, etc.

Figure 5:
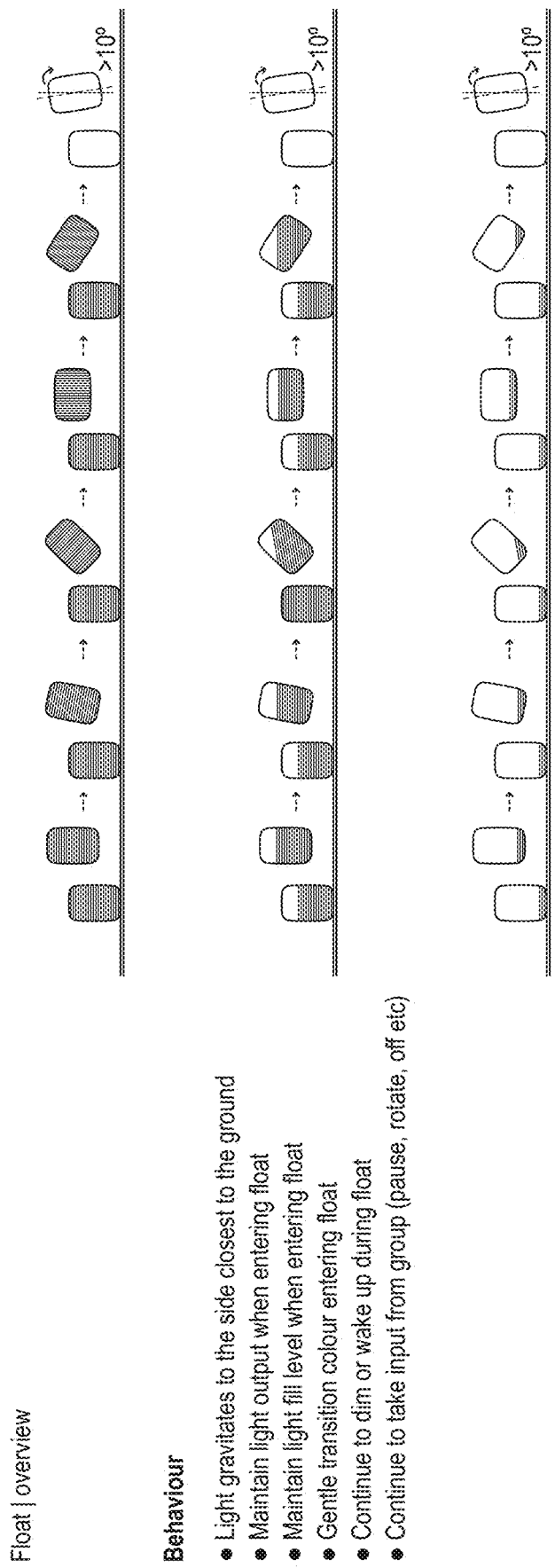
FIG. 5 depicts a float mode of device operation in accordance with some embodiments of the present invention.

An exemplary operation of the Float mode is disclosed in FIG. 5. The Float mode is further described below, in the context of a lamp operating in a lamp-group having two or more lamps.

In addition to responding to the user's manual manipulations, the lamp could also be controlled remotely via a wireless link from other devices, such as smart phones, laptops, or other wireless devices. For example, a software application ("app") on a smart phone could be used to program the lamp to turn the brightness level "off," "on," or at some mid-level of brightness on a specific schedule, which could be correlated with other events, such as a wake-up alarm signal, an appointment alarm, bedtime routine, etc. In addition, the app could be used to remotely control the lamp in real time, such as turning on the illumination, varying brightness, tone, or synchronizing it to surrounding environment, such as ambient brightness, music, sound, etc.

As mentioned above, a lamp of the present invention can also operate in a group of two or more lamps. In order for the lamp to become a part of such a group, the radio interface of each lamp in the group is activated, allowing the lamps to link to each other wirelessly. For example, in one embodiment each lamp includes a Bluetooth wireless interface. When two or more lamps are activated (powered up), the Bluetooth interface in each lamp will detect the other lamps and will link all of the detected lamps into a group.

Figure 4B:
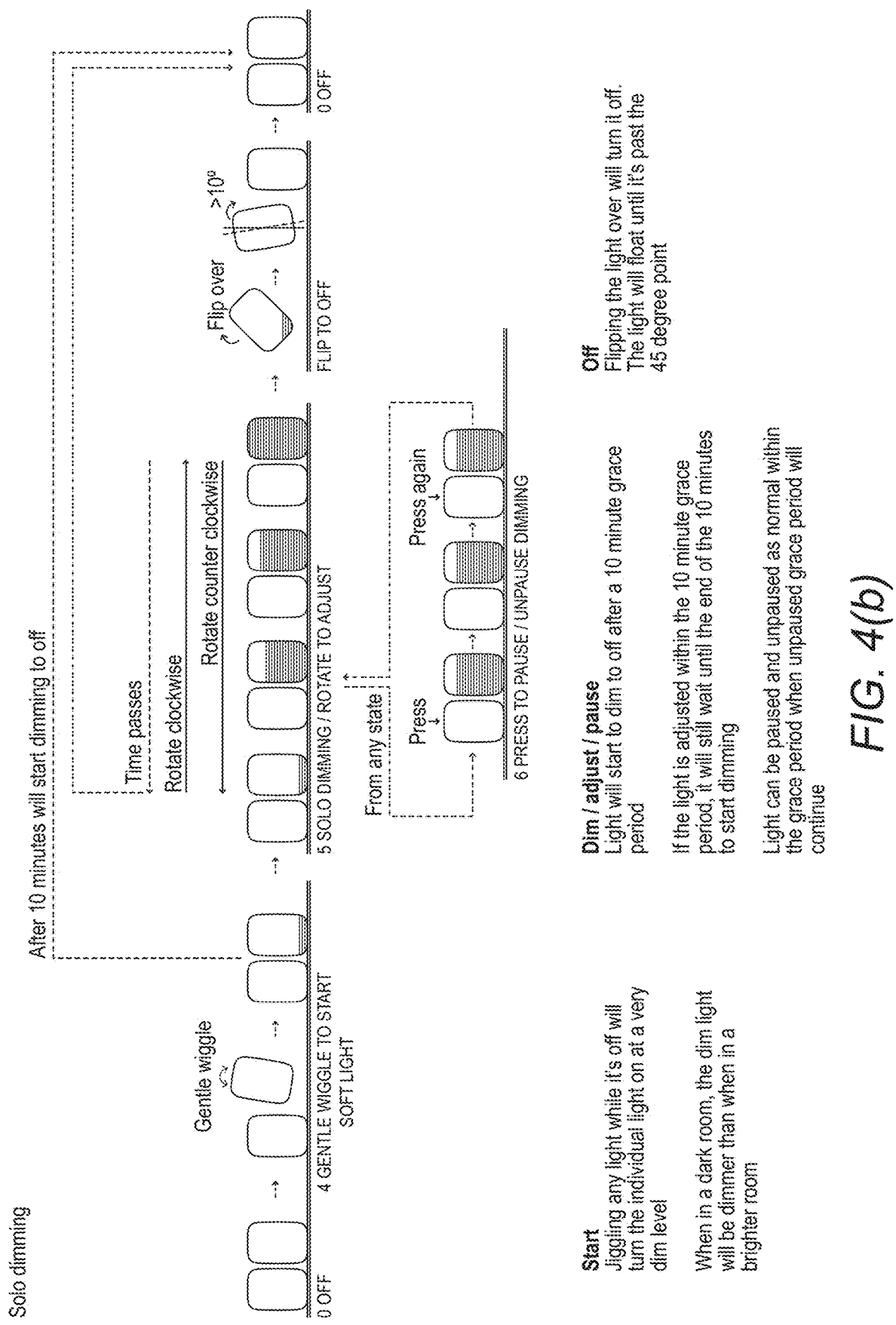

Device Interaction and State Diagrams:

FIGS. 4(a) and 4(b) depict state diagrams of device operation and interactions in a group of two or more linked lamps in accordance with some embodiments of the present invention. FIG. 4(a) shows a state diagram depicting synchronized dimming and FIG. 4(b) shows a state diagram depicting solo dimming. Similarly-numbered states in the two figures represent the same system-condition. The following is a description of the operations and interactions in FIG. 4(a).

State_0 corresponds to a system state in which every lamp in a group is in an "idle" mode, in which the lamps' electronics is powered up (activated) but produces no illumination.

If a lamp is flipped by more than a predetermined number of degrees, the system will go into State_1. In State_1, the flipped lamp and all of the connected lamps in the lamp-group are turned "on" to full brightness. In one embodiment, a flip is detected once the lamp has been tilted from its initial position by, for example, about 135 degrees.

Figure 6:
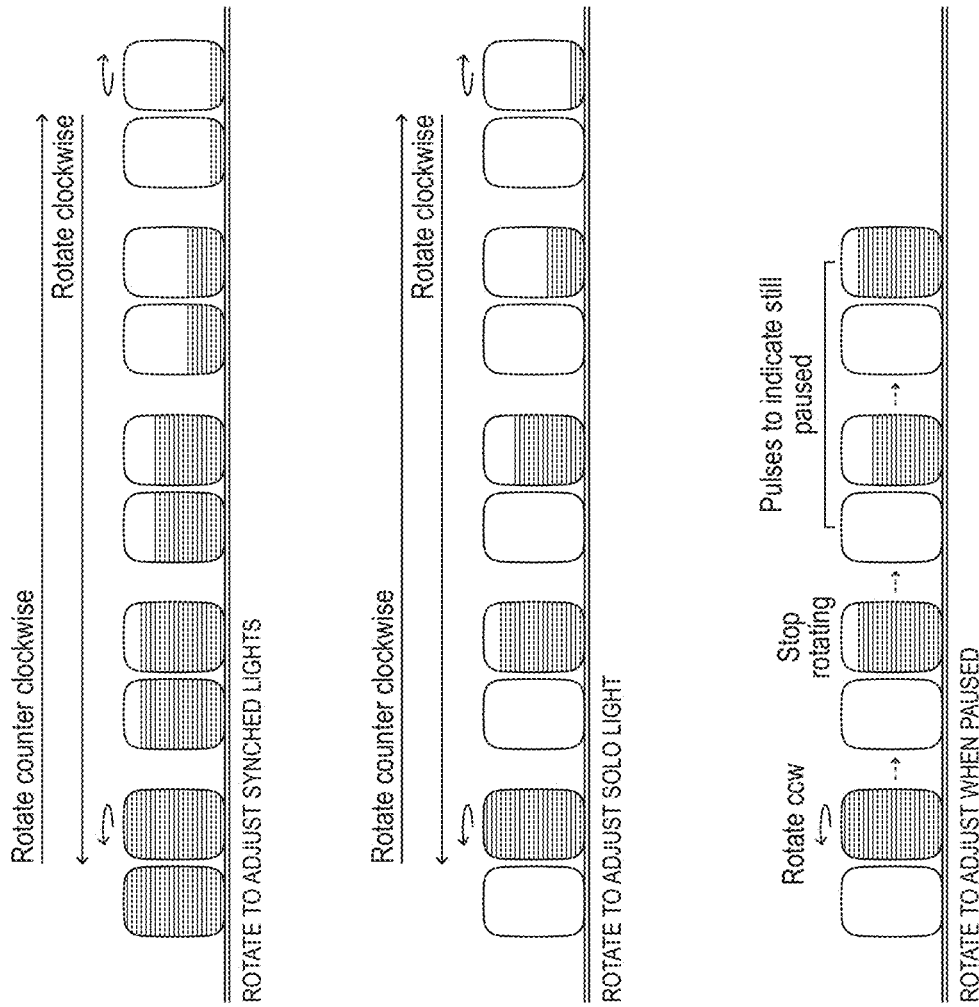
FIG. 6 discloses brightness adjustments in various scenarios, including in synched dimming and paused modes, in accordance with some embodiments of the present invention.

From State_1, the system may move into State_2 (synchronized dimming). In State_2, all of the lamps in a group dim in unison (dim together as a group), starting at full brightness. While the system is in State_2, rotating any lamp clockwise or counterclockwise will increase or decrease the brightness level, respectively, of all the lamps in the group in unison. The lights will stop getting brighter at the brightest state even if the user continues rotating the lamp clockwise. Similarly, in one embodiment, the lights will stop dimming once the dimmest brightness has been reached even if the counterclockwise (dimming) rotation continues. In another embodiment, if the user keeps rotating the lamp counterclockwise, the lights will dim to "off." Once the rotation stops, all of the lamps in the group will continue their synchronized dimming at the same rate. (See FIG. 6 for a more detailed illustration of brightness adjustments in various scenarios, including in the synchronized dimming and paused modes.) Left undisturbed for a period of time (e.g., 45 minutes), the lamps could eventually dim to "off," effectively putting the system back into State_0. Alternatively, the lamps could dim to the dimmest setting and remain there for a specified period of time, which could be programmed internally or via the app In one embodiment, if the user chooses to control the lamp via an app, all lamps will stop at some predetermined dim level after a particular time period (e.g., one hour) of no movement of the lamp (no rotate, etc.). In addition, if the system uses a motion detector (e.g., a camera, an IR sensor, etc.) the lamps could stop at the dimmest setting and turn "off" the illumination after there hasn't been any movement in the room for a specified period of time, e.g., 10 minutes.

In another embodiment, an app could be used to program an animation (dimming or waking up of brightness) of an individual lamp. If a lamp is rotated in the middle of an animation, the rotation could either be used to interrupt the animation or it could be ignored until the animation is complete. Once the animation has been completed, the rotation input will translate to brightness adjustments.

When the system is in State_2, pressing the top button on any lamp will stop all of the lamps in the group from dimming at whatever level of brightness they are at and will move the system into State_3 (synchronized pause). In one embodiment, the lights may indicate to the user that they have been "paused" by pulsing a predetermined number of times, e.g., once. In one embodiment, when rotated while paused, the lights will not change. In an alternative embodiment, rotating any light while in the "synchronized pause" condition will cause them to pulse, to indicate to a user that they are paused. Pressing the top button again on any light will un-pause all of the lights in the group and will return the system from State_3 back to State_2, to continue synchronized dimming at the same rate. In another embodiment, rotating a light while paused, may also un-pause it. In another embodiment, the synchronized pause may time-out after a predetermined time, e.g., one hour, at which point all the lights in the group will return the system from State_3 back to State_2, to continue the synchronized dimming at the same rate. The lights may indicate that they have been un-paused by pulsing a predetermined number of times, e.g. once. If, while in State_2 (synchronized dimming) any lamp in the group is flipped over, the system will move back to State_0, putting all the lamps in the group into "idle." As explained above, a flip is detected once the lamp has been tilted from its initial position by, for example, about 135 degrees. While in State_2, during tilting and until the 135 degree-point (or some other predetermined float-mode exit point) has been reached, the lamp circuitry senses lamp's orientation and dynamically controls the LEDs to produce a floating behavior.

Following is a description of the operations and interactions disclosed in FIG. 4(b). As explained above, State_0 corresponds to a system state in which every lamp in a group is in an "idle" mode, in which the lamps' electronics is powered up (activated) but produces no illumination.

If a lamp is wiggled, the system will go into State_4, where the wiggled lamp will turn on at the dimmest, or at a very dim, illumination level, while the other lamps in the group remain in the "idle" mode. The dimmest, or very dim, illumination level may be dimmer in a dark room than in a brighter room. This could be achieved by using an ambient light sensor. It could also be achieved by keeping track of tie and correlating brightness to time of day. Unless the user manually increases the lamp's brightness as explained below, the wiggled lamp will maintain the dim illumination level (linger) for a set period of time, e.g. 10 minutes, and then will dim to zero illumination over a predetermined duration, e.g., 2 to 5 minutes, placing the system back into State_0. This feature is useful for allowing a person to light his or her way around the home when the person wakes up in the middle of the night, without being overstimulated by a bright light, and then goes back to sleep a short time later (e.g., when the person wakes up to go to the bathroom). (In an alternative embodiment, dimming to zero illumination could be done in a matter of seconds or even instantaneously.) The maintained dim-illumination period and the follow-up process of dimming to "off" can be considered a part of a system state designated in FIG. 4(b) as State_5, called "solo dimming mode.".

While the system is in State_5 (solo dimming), the user can make the lamp brighter, by rotating the lamp clockwise, or dimmer, by rotating the lamp counterclockwise. (See FIG. 6 for a more detailed illustration of brightness adjustments in various scenarios, including solo dimming and paused modes.)

If, while in State_5 (solo dimming), the lamp is flipped over, the system may move back into State_0, putting the flipped lamp back in into "idle."

While the system is in State_5, pressing a button on the lamp that is dimming will stop the dimming and will move the system into State_6 (solo pause). In one embodiment, the lamp may indicate that it is in the "solo pause" condition by pulsing a predetermined number of times, e.g., once. In one embodiment, when rotated while paused, the light will not change. In an alternative embodiment, rotating the light while in the "solo pause" condition will cause it to pulse, to indicate that it is paused. Pressing a button of the paused lamp again will un-pause the lamp and will return the system from State_6 back to State_5, to continue solo dimming at the same rate. In another embodiment, rotating the light while in solo pause, may also un-pause it. In another embodiment, the solo pause may time out after a predetermined time, e.g., one hour, at which point the light will return the system from State_6 back to State_5, to continue solo dimming at the same, or some other predetermined, rate. The light may indicate that it has been un-paused by pulsing a predetermined number of times, e.g. once.

Figure 7:
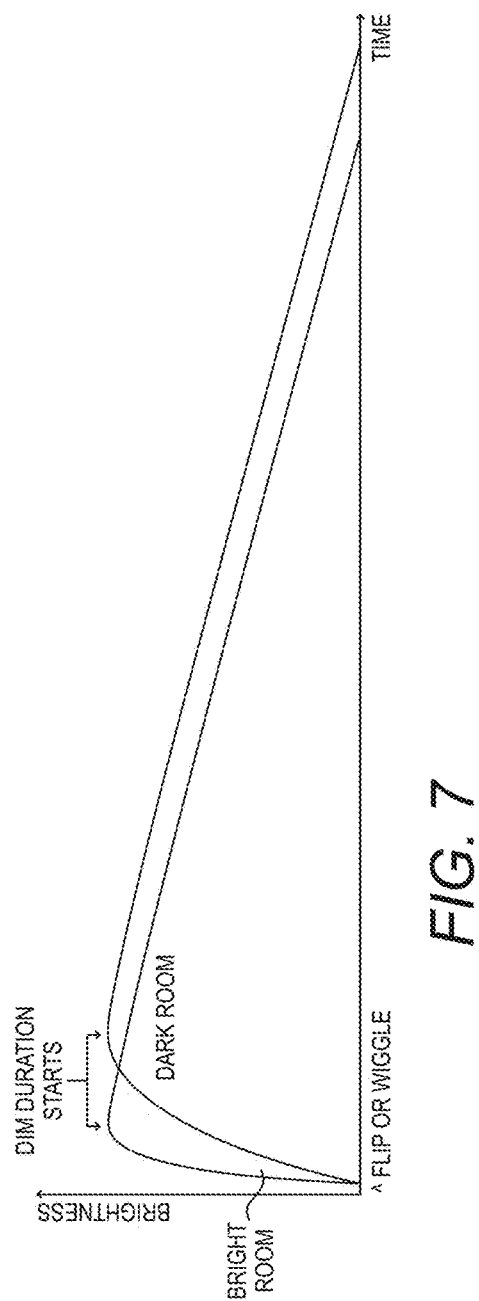
FIG. 7 illustrates how ambient light could be used in controlling a lamp's brightness levels in accordance with some embodiments of the present invention.

As described above, lamp illumination maybe turned on by either flipping the lamp or wiggling it. If the system also includes an ambient light sensor (ALS), the sensed ambient light could be used to determine the initial dimmest illumination level at which a lamp might start, the speed at which the lamp(s) will come on to full brightness as well as the speed at which it(they) will dim back down. For example, when a user flips a lamp "on" in a dark room (as sensed by the ALS), the lamp could get to its full brightness slowly, to avoid jarring the user with bright light all at once. When the user flips the same lamp in a well-lit room, however, the lamp could get to its full brightness faster. As another example, when a user wiggles the lamp in a dark room (as sensed by the ALS), the lamp may turn on at a very dim level, such as a level that in a well-lit room it might not be visible. When a user wiggles the same lamp in a brighter room, however, the light might come on at a level that is dim, but that is visible in a bright room. FIG. 7 illustrates how ambient light could be used in controlling the lamp's brightness levels. In another embodiment, the amount of ambient light could also be used to control the lamp's maximum brightness level.

ALS could also be used during the user's first-time unboxing of the lamp, after purchase. In such a scenario, the ALS in the lamp could sense a change in brightness when a box is opened, causing the rest of the lamp's circuitry, such as brightness control circuitry, to be activated. The lamp will animate to indicate that it is ready to be used and to create a welcoming experience for the user.

Figure 8:
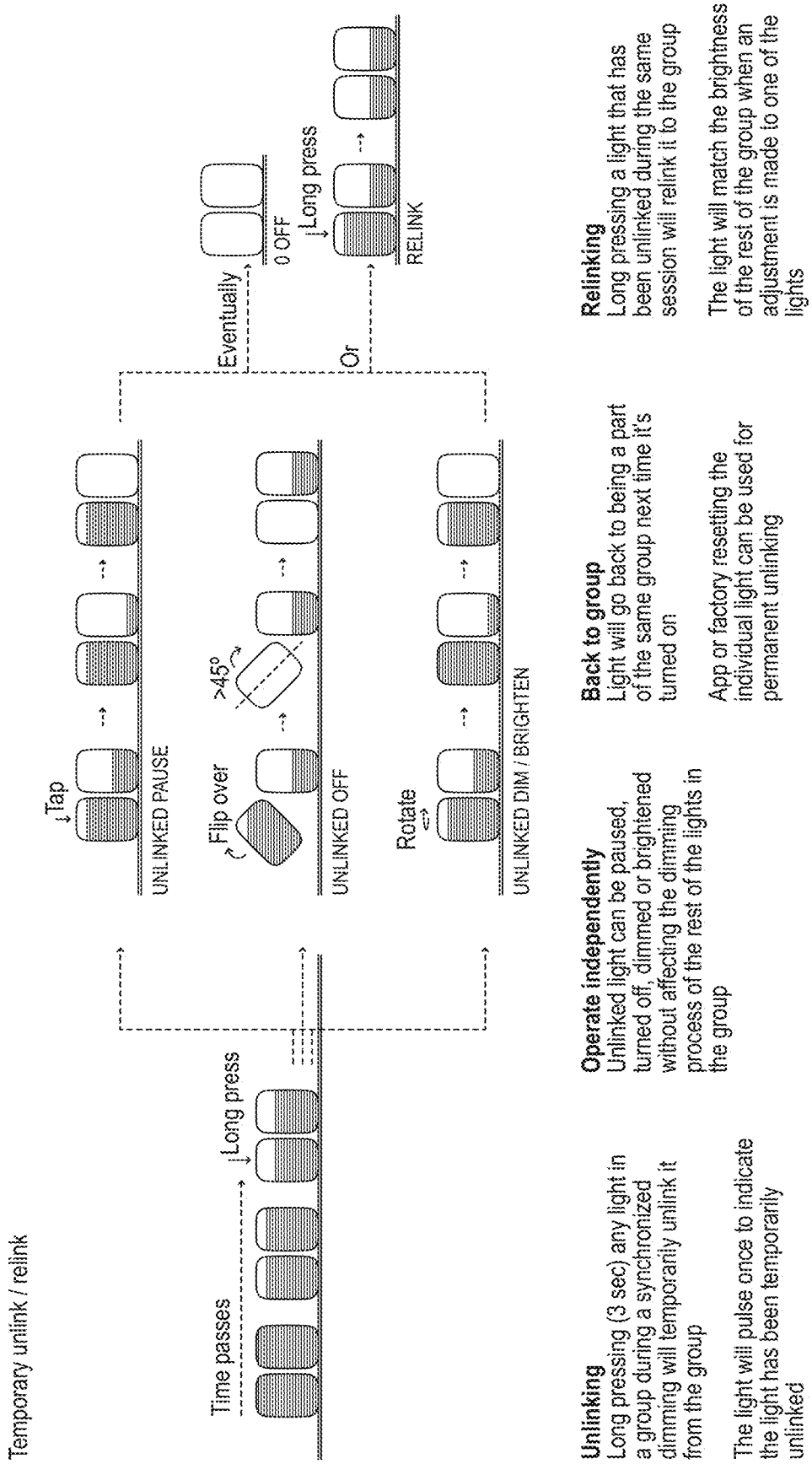
FIG. 8 discloses temporary unlinking and relinking of a lamp in accordance with some embodiments of the present invention.

FIG. 8 discloses temporary unlinking and relinking of a lamp in accordance with some embodiments of the present invention. For example, long pressing a lamp in a group of lamps that are in synchronized dimming will unlink it from the group. The unlinked light may be paused, turned off, dimmed, or brightened, without affecting the dimming process of the rest of the group. The next time the light is turned on, it could go back to being a part of the same group. Long pressing a button on a lamp that has been unlinked during the same session could also relink it to the group. In relinking to the group, the light generated by the lamp will gradually match the rest of the group. In another embodiment, the light will match the rest of the group right away. An app or factory setting could be used for permanent unlinking of an individual lamp.

FIG. 9 discloses an exemplary event table for temporary unlinking and relinking of a lamp in accordance with some embodiments of the present invention.

Figure 10B:
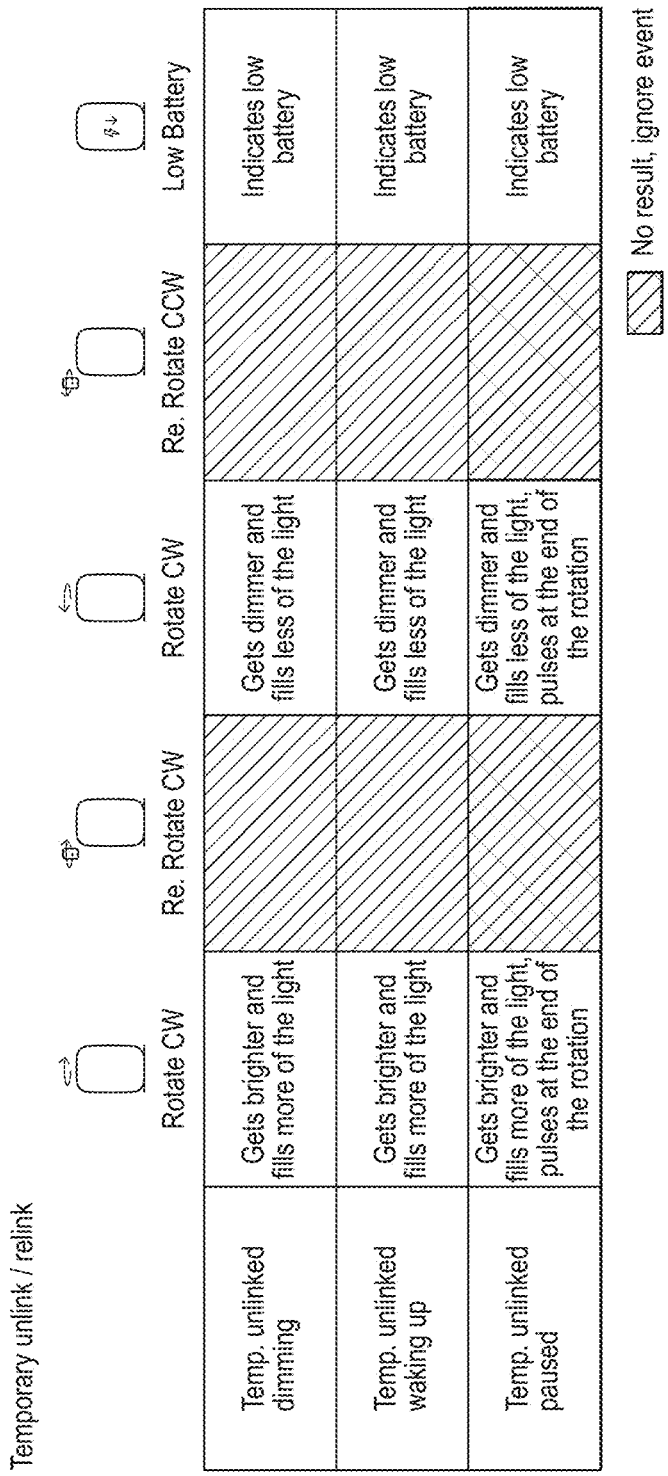

FIGS. 10(a), 10(b), and 10(c) provide a exemplary state table disclosing what happens to a temporarily unlinked device when another operational event occurs in accordance with some embodiments of the present invention.

A lamp could be programmed, via an app on a wireless device, to wake a person up by turning on the lamp's brightness, alone or in a group of lamps, at a specific time. In one embodiment, this visual wake-up feature could be synchronized with an audio alarm from an alarm clock or a cell phone. The wake-up feature could operate as follows.

The programmed lamp(s) will turn on at some intermediate brightness level a predetermined time (e.g., 15 minutes) before a set time. The brightness level will gradually increase and, depending on an embodiment, will reach a maximum level at some predetermined time (e.g., 30 minutes) later or, if synchronized to an audio alarm, at the same time when the audio alarm sounds. Once the maximum brightness level has been reached, the level will be maintained (linger) for some set time period (e.g., 10 minutes) and will then dim to off over some set duration (e.g., 15 minutes).

For example, when only a single light is scheduled to wake up, the lamp's illumination starts at some low level and begins to increase, either by: (a) gradually turning "on" the illumination sources, e.g., LEDs inside the lamp, to make the illumination appear to move up (fill up) the lamp; (b) activating all of the light sources inside the lamp simultaneously at a low duty cycle and gradually increasing the illumination level by increasing the duty cycle; or (c) a combination of (a) and (b).

For example, the lamp's illumination starts and begins rising 30 minutes before the scheduled wake up time and reaches the highest brightness (highest fill) level 30 minutes after the wake-up time. This rising of the brightness level could be paused and adjusted the same way that solo dimming can be paused or adjusted (see discussion of State_5, above). If more than one lamp has been scheduled to wake up together, they could both respond to adjustments and pauses together, the same way that the synchronized dimming can be adjusted and paused (see discussion of State_2, above). When two or more lamps are waking up together, a user is able to temporarily unlink them. If the lamp(s) is adjusted during wake up, it/they could continue to brighten following the adjustment. Once the highest brightness has been reached, the light(s) will linger (continue illuminating) at the highest level for a programmed amount of time, e.g., 5, 10, 15, or 30 minutes. If the lamp(s) is rotated clockwise during linger at the maximum brightness, to increase brightness level, the adjustment is ignored. If the lamp(s) is rotated counterclockwise during linger at the maximum to decrease brightness level, the adjustment may be made, linger time may be reset, and the lamp(s) may continue to brighten following the adjustment.

At the end of the linger period, the lamp(s) could start dimming, and will dim down over a set duration. A lamp could be flipped to "off," i.e., the illumination can be turned "off," at any time. If more than one lamp was waking up together, flipping any lamp to "off" would turn off the illumination of the whole group. If the lamp(s) is adjusted during the dimming period, then it/they will continue dimming following the adjustment.

Figure 11:
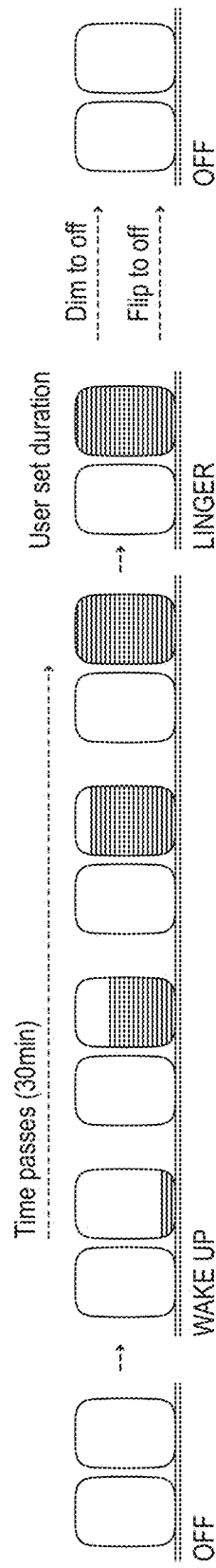
FIG. 11 illustrates operation of a wake-up feature in accordance with some embodiments of the present invention.

FIG. 11 illustrates operation of a wake-up feature in accordance with some embodiments of the present invention. Other variations of brightness levels and timing sequences of the wake-up feature are possible and are within the scope of the present invention.

FIG. 12 provides an event table disclosing what happens to a device that is programmed to wake up when another control signal is received in accordance with some embodiments of the present invention. The invented system is not limited to the events described in the event table, and other or additional events are within the scope of the present invention.

FIGS. 13(a) and 13(b) provide a state table for a wake-up feature in accordance with some embodiments of the present invention.

FIG. 14 shows sample display screens appearing on a mobile device when an app is used to program a wake-up feature in accordance with some embodiments of the present invention.

FIGS. 15(a) and 15(b) show behavior of a multi-lamp system with programmed overlapping wake-up times in accordance with some embodiments of the present invention. The invented system is not limited to the behavior disclosed in the figures, and other or additional system behaviors are within the scope of the present invention.

Figure 16:
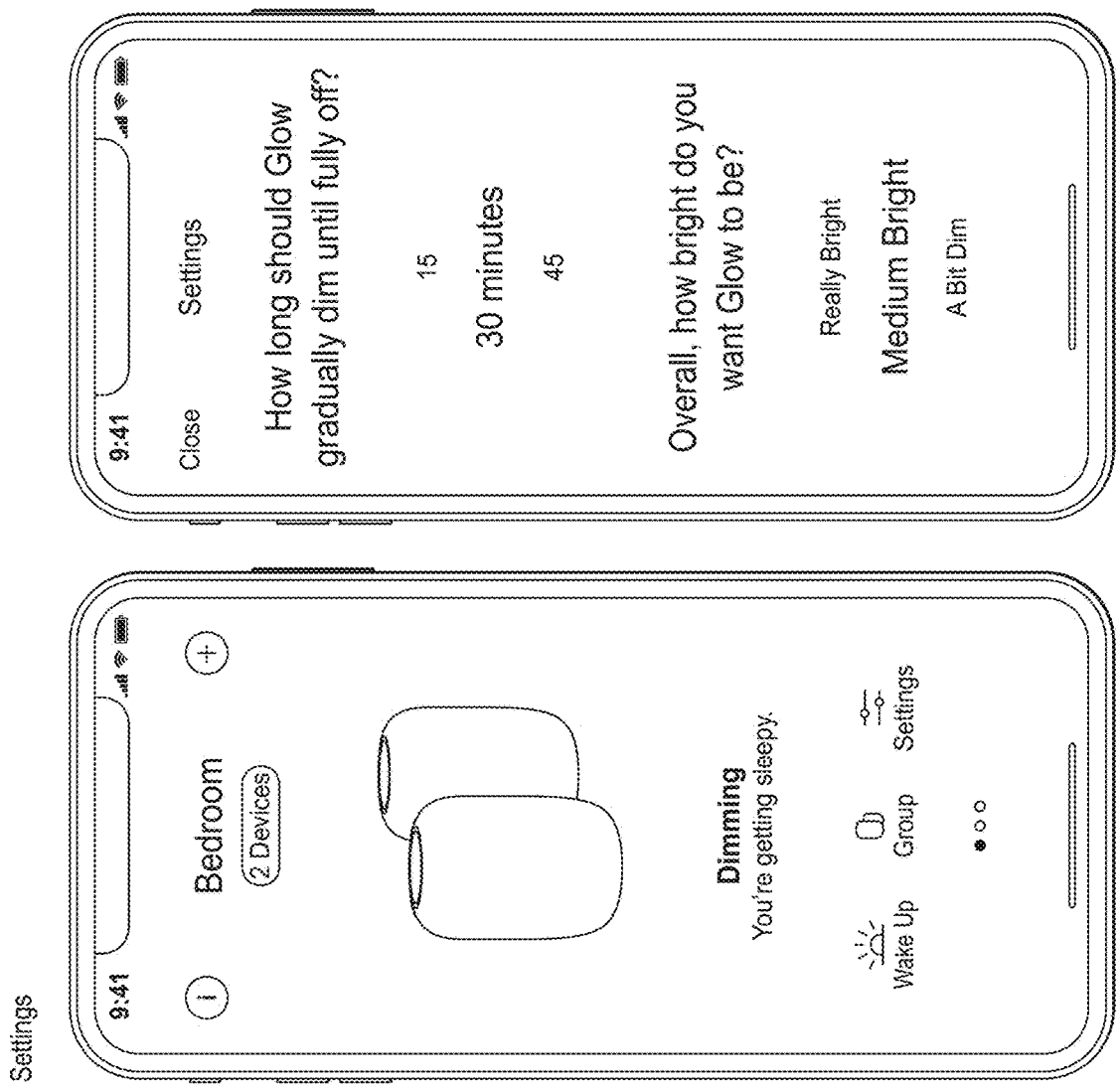
FIG. 16 shows sample display screens appearing on a mobile device when an app is used to program illumination and dimming in accordance with some embodiments of the present invention.

FIG. 16 shows sample display screens appearing on a mobile device when an app is used to program illumination and dimming in accordance with some embodiments of the present invention. The display screen on the left of FIG. 16 shows that a group of one or more bedroom lamps has been selected for dimming. The display screen on the right of FIG. 16 shows the starting brightness has been set at a "medium" level and the dimming duration has been set for 30 minutes. In the embodiment illustrated in FIG. 16, all setting changes apply to all lamps in the group, and all feedback behavior appears on all the lamps in the group. When a new light is linked to the group, it may match the rest of the group's settings. Dimming duration adjusts the length of the dimming process and can be set for various time periods, e.g., 15, 30, 45, 60, or 90 minutes long. In one embodiment, once the user has finished changing the dimming duration, or a short period thereafter (e.g., ½ second), all the lamps in the programmed group will pulse to indicate confirmation of the setting change. While the brightness level is being set via the app, the lamps in the group could either be idle (powered up, but no illumination) or they could be illuminating.

If brightness level is adjusted while the lamp(s) is idle, the lamp(s) does not give any visual feedback. If brightness level is adjusted via the app while the lamp(s) is "on" (illuminating), the lamp(s) will jump to the new brightness yet stay at the same fill level.

In another embodiment, if the brightness level is being set while the lamps in the group are idle, the lamps will turn on the illumination at the set brightness level. If no other interaction happens over some predetermined time thereafter, e.g., 2 seconds, the lamps will go back to idle. If, however, the setting is changed again, via the app, within the 2 seconds, the lamps will jump to their new brightness setting. If a lamp in the group is rotated within the 2 seconds after the brightness level has been set, the lights in the group will adjust to their brightness and will then animate to idle a predetermined time (e.g., 2 seconds) after the rotation is complete.

In one embodiment, if the brightness level is being set while the lamps in the group are illuminating, the lamps will jump to the new brightness and will remain illuminated at the same fill level.

As mentioned above, each of the lamps of the present invention include a rechargeable battery. Depending on the amount of charge in the battery, during discharging and during charging, the system performance, light behavior, and app indication may differ.

Figure 17:
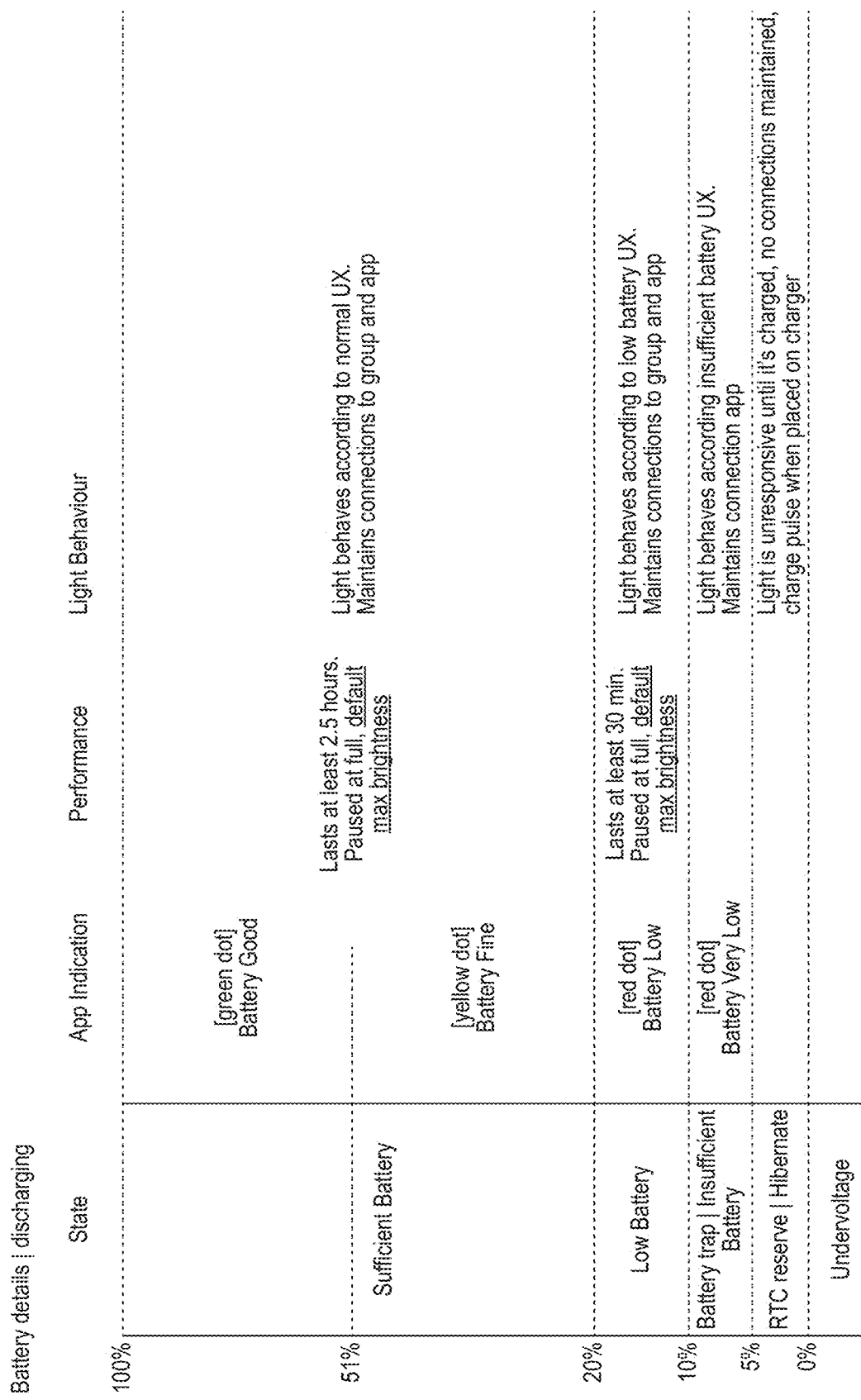
FIG. 17 discloses system performance, light behavior, and app indication when the battery is discharging in accordance with some embodiments of the present invention.

FIG. 17 discloses system performance, light behavior, and app indication when the battery is discharging in accordance with some embodiments of the present invention.

FIG. 18 discloses system performance, light behavior, and app indication when the battery is charging in accordance with some embodiments of the present invention.

Figure 19A:

FIGS. 19(a) and 19(b) provide a state table disclosing what happens to a device with low battery when another control signal is received in accordance with some embodiments of the present invention. The invented system is not limited to the states described in the state table in FIGS. 19(a) and 19(b), and other or additional states are within the scope of the present invention.

FIG. 20 illustrates system behavior when a lamp's button is pressed for a very long period, e.g., more than 6 seconds, while the lamp is in various operating modes in accordance with some embodiments of the present invention. The invented system is not limited to the behavior described in the FIG. 20, and other behaviors are within the scope of the present invention.

Figure 21:
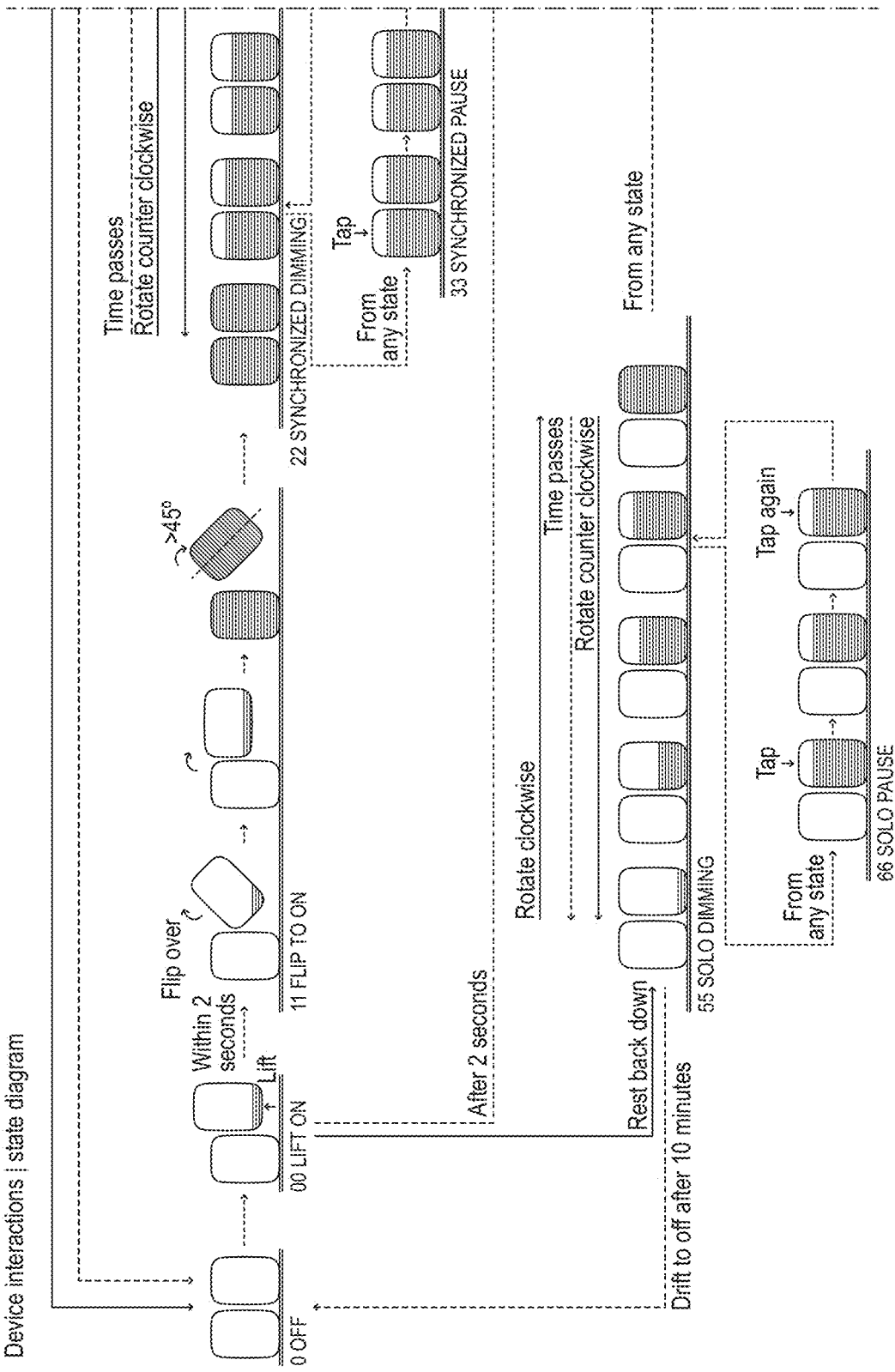
FIG. 21 illustrates a state diagram of device operation and interactions in a group of two or more linked lamps in accordance with another embodiment of the present invention.
Figure 21:
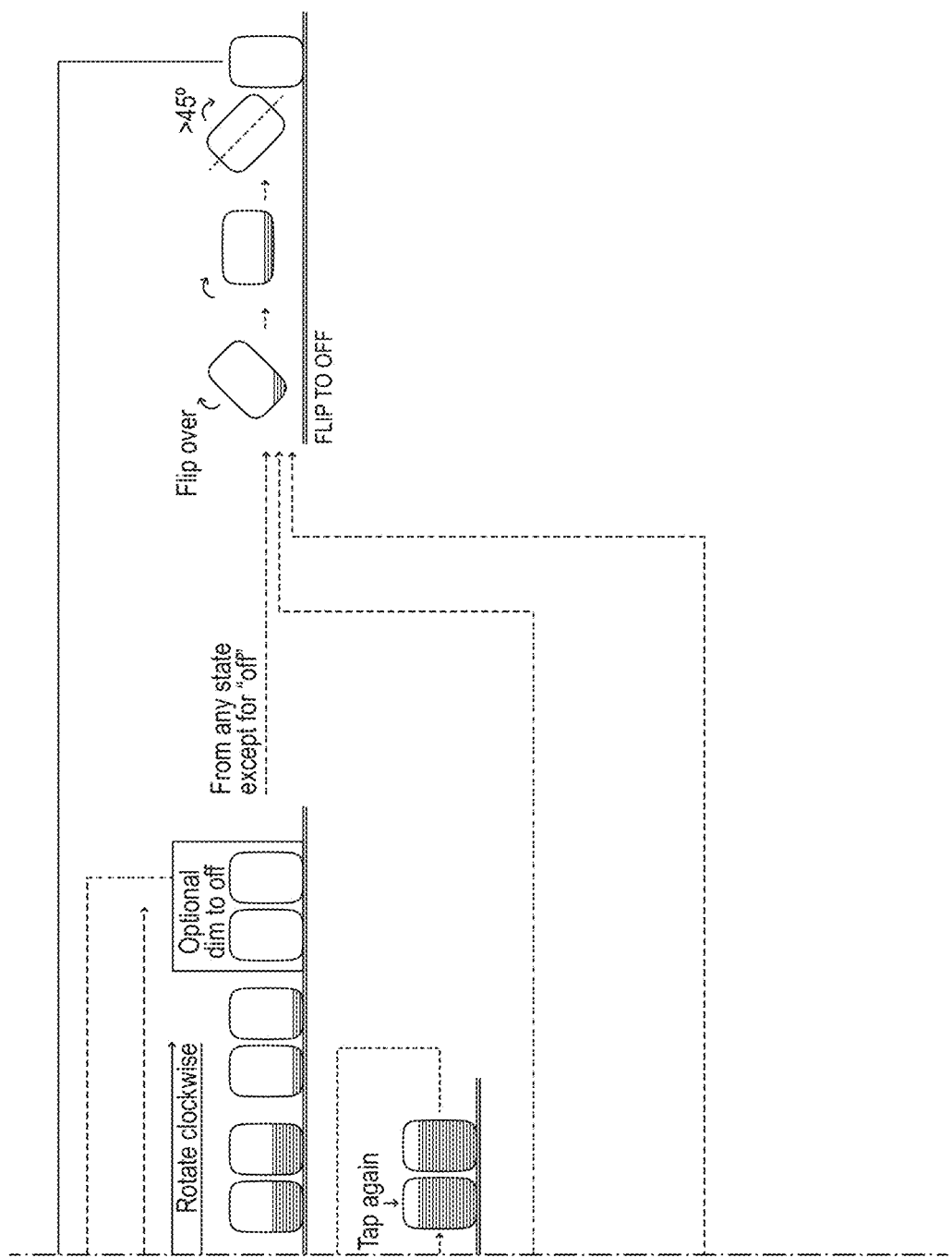

FIG. 21 depict a state diagram of device operation and interactions in a group of two or more linked lamps in accordance with another embodiment of the present invention. In this embodiment, "lift" (lifting a lamp off the surface it has been sitting on) is used as one of the commands to control the lamp(s).

Similar to State_0 in FIGS. 4(a) and 4(b), State_0 in FIG. 21 corresponds to a system state in which every lamp in a group is in an "idle" mode, where the lamps' electronics is powered up (activated) but produces no illumination.

When a user lifts any lamp that has no illumination, the system goes into State_00, where the lifted lamp turns on at some predetermined dim setting, for example the dimmest level, while the other lamps in the group remain in the "idle" mode. The dimmest setting may be dimmer when in a dark room than in a brighter room. This could be achieved by using an ambient light sensor. It could also be achieved by keeping track of time and correlating brightness to time of day.

After entering State_00, if the lamp is flipped within a predetermined period (e.g., within 2 second), the system will go into State_11. In State_11, all the connected lamps in the group are turned "on" to full brightness. In one embodiment, a flip is detected once the lamp has been tilted from its initial position by a predetermined amount, e.g., about 135 degrees. During tilting, until the 135 degree-point (or some other predetermined float-mode exit point) has been reached, the lamp circuitry senses lamp's orientation and dynamically controls the LEDs to produce a floating behavior.

From State_11, the system may move into State_22 (synchronized dimming). In State_22, starting at full brightness, all the lamps in the group dim in unison (dim together as a group). While the system is in State_22, rotating any lamp clockwise or counterclockwise will increase or decrease the brightness level, respectively, of all of the lamps in the group in unison. Once at the brightest level, the lights will stop getting brighter even if the user continues rotating the lamp clockwise. Similarly, in one embodiment, the lights will stop dimming once the dimmest brightness has been reached even if the counterclockwise (dimming) rotation continues. In another embodiment, if the user keeps rotating the lamp counterclockwise, the lights will dim to "off." Once the rotation stops, all the lamps in the group will continue their synchronized dimming at the same rate. Left undisturbed for a period of time (e.g., 45 minutes), the lamps could eventually dim to "off," effectively putting the system back into State_0. In the alternative, the lamps could dim to the dimmest setting and remain there for a specified period of time, which could be programmed internally or via the app In one embodiment, if the user chooses to control the lamp via an app, all lamps could stop at some predetermined dim level after a particular time period (e.g., one hour) of no movement of the lamp (no lift, no rotate, etc.). In addition, if the system uses a motion detector (e.g., a camera, an IR sensor, etc.) the lamps could stop at the dimmest setting and turn "off" the illumination after there hasn't been any movement in the room for a specified period of time, e.g., 10 minutes.

In another embodiment, an app could be used to program an animation (dimming or waking up of brightness) of an individual light. If a light is rotated in the middle of an animation, the rotation could either be used to interrupt the animation or it could be ignored until the animation is complete. Once the animation has been completed, the rotation input will translate to brightness adjustments.

In another embodiment, the system could enter State_22 (synchronized dimming) when flipping is detected even without the lamp being lifted first. For example, flipping any lamp while it is "off," could initiate synchronized dimming. At that point, all linked lamps that were previously in the "off" state will turn "on" at full brightness and start dimming together (in unison).

When the system is in State_22, pressing the top button on any lamp will stop all the lamps in the group from dimming at whatever level of brightness they are at and will move the system into State_33 (synchronized pause). In one embodiment, the lights may indicate to the user that they have been "paused" by pulsing a predetermined number of times, e.g., once.

In one embodiment, when rotated while paused, the lights will not change. In an alternative embodiment, rotating any light while in the "synchronized pause" condition will cause them to pulse, to indicate to a user that they are paused.

Pressing the top button again on any light could un-pause all the lights in the group and return the system from State_33 back to State_22, to continue synchronized dimming at the same rate.

In another embodiment, rotating a light while paused, may also un-pause it.

In another embodiment, the synchronized pause may time-out after a predetermined time, e.g., one hour, at which point all the lights in the group will return the system from State_33 back to State_22, to continue synchronized dimming at the same rate. The lights may indicate that they have been un-paused by pulsing a predetermined number of times, e.g. once.

If, after entering State_00 (i.e., turning on in a very dim illumination after detecting a lift) the sensing and control circuitry detects that the lamp was placed back down, the system could enter State_55 (solo dimming), in which the lamp that was placed back down would linger for a set period of time at the brightness level it had in State_00 and then, similar to the solo dimming process disclosed in FIG. 4(b), dim to zero illumination over a predetermined duration. While the system is in State_55, rotating the lamp clockwise or counterclockwise will increase or decrease the lamp's brightness level, respectively. Left undisturbed for a period of time, the lamp's brightness will eventually reach its dimmest level. In some embodiments, once the lamp has reached its dimmest level, it could further go back to zero brightness, which in FIG. 21 is shown as State_0. In another embodiment, once the lamp has entered State_55, it will start dimming down after a predetermined period of time, e.g., 10 minutes, has passed with no manipulation of the lamp or movement in the room detected (no further lifting, tilting, pressing or rotating of the lamp, and and/or no surrounding movement in the room).

While the system is in State_55, however, pressing a button on the lamp that is dimming or rising will stop the process and will move the system into State_66 (solo pause). In one embodiment, the light may indicate that it is in the "solo pause" condition by pulsing a predetermined number of times, e.g., once. In one embodiment, when rotated while paused, the light will not change. In an alternative embodiment, rotating the light while in the "solo pause" condition will cause it to pulse, to indicate that it is paused. Pressing a button on the lamp again will un-pause the lamp and return the system from State_66 back to State_55, to continue changing brightness at the same rate. In another embodiment, rotating the light while in solo pause, may also un-pause it. In another embodiment, the solo pause may time out after a predetermined time, e.g., one hour, at which point the light will return the system from State_66 back to State_56, to continue changing brightness at the same rate. The light may indicate that it has been un-paused by pulsing a predetermined number of times, e.g. once.

While the system is in State_22, State_33, State_55, or State_66, flipping the illuminating lamp will turn "off" its illumination, placing the system back into State_0. While in State_00 or State_55, tilting the lamp in any direction causes the device to "float" (causes the light inside to gravitate towards the side closer to the ground, for example, until the tilt angle is past about the 135-degree point), When floating, the amount and temperature (tone) of light may be maintained.

While the system is in State_22, flipping any illuminating lamp in the lamp-group will turn off the illumination in all the synchronized lamps (lamps in the lamp-group), placing the system back into State_0.

While the system is in State_22 (synchronized dimming), long pressing (e.g., 3 seconds) a button on any lamp in the group will unlink the lamp from the group, at which point the unlinked lamp will pulse a predetermined number of times (e.g., once) to indicate that it has been unlinked (temporarily or permanently) and at which point the unlinked lamp could be operated independently. For example, the unlinked lamp can be paused, turned "off," dimmed, or brightened without affecting the rest of the lamps in the group. The unlinked lamp can go back to being a part of the same lamp-group next time it is activated. The app could be also be used for temporary or for permanent unlinking. Long pressing (e.g., 3 seconds) a button on a lamp that has been unlinked from a group during the same session could relink it to the group. In one embodiment, the relinked lamp will gradually match its illumination with the rest for the group.

In addition to the operation described above, lamp buttons could be used to provide other controls. For example, if a lamp is wiggled while its brightness is "off," it will turn the brightness "on" at a predetermined setting, such as a very low illumination level. The level could be based on either the light level of surrounding environment or on time of day.

As another example, pressing and holding a button for a long time (e.g., 6 seconds) could be used as a command to power the lamp "off" Pressing and holding the button again could be used as a command to power the lamp back on.

As another example, pressing both buttons on a lamp for a predetermined period (e.g., 20 seconds) could be used as a command to reset the lamp.

As another example, pressing one button on a lamp a predetermined number of times (e.g., 6 times) while holding down the other button could be used as a command to factory reset the lamp, resetting any setting back to a default setting and unlinking the lamp from any group it was previously a part of.

While the foregoing descriptions disclose specific values, any other specific values may be used to achieve similar results. Further, the various features of the foregoing embodiments may be selected and combined to produce numerous variations of improved systems.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art. The term "coupled" as used herein is defined as connected, although not necessarily directly and not necessarily mechanically. A device or structure that is "configured" in a certain way is configured in at least that way but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed is:

1. A lighting system comprising: at least one portable lamp comprising:
    a light source comprising at least one light emitting diode for providing illumination;
    a control circuit configured to control illumination of said light source;
    a translucent housing adapted to permit illumination from said light source to pass through it, said housing adapted for being held in a user's hand while said light source is illuminating a space exterior to said translucent housing;
    a spatial sensor coupled to said control circuit, said spatial sensor configured to sense changes in spatial orientation of said at least one portable lamp based on a user's manipulation of said translucent housing; and
    a power source for providing power to said spatial sensor, said controller, and said light source;
    wherein said control circuit controls operation of said at least one portable lamp based on a signal from said spatial sensor, such that said at least one portable lamp animates its illumination;
    wherein said power source, said light source, said control circuit, and said spatial sensor are located within the interior space of said translucent housing, such that said power source. said control circuit. and said sensor are covered under a translucent cover of said translucent housing: and
    wherein, upon the user's manual rotation of said translucent housing about a horizontal axis passing through said translucent housing, said control circuit causes said at least one portable lamp to enter a float mode, in which said control circuit dynamically changes which light emitting diode is on depending on the portable lamp's spatial orientation, and in which said light source appears to gravitate to a side of said housing that is closer to ground.

2. A lighting system of claim 1, wherein said spatial sensor senses at least one of flipping, wiggling, lifting, and rotating of said translucent housing by said user.

3. A lighting system of claim 1, wherein said control circuit turns on illumination from said at least one portable lamp based on a signal from said spatial sensor.

4. A lighting system of claim 1, wherein said control circuit varies illumination from said at least one portable lamp based on a signal from said spatial sensor.

5. A lighting system of claim 1, wherein said control circuit causes said at least one portable lamp to animate its illumination by controlling at least one of an overall brightness level of said lamp and a fill level of the illumination in said lamp.

6. A lighting system of claim 1, wherein said lighting system comprises a plurality of portable lamps, and wherein operation of said plurality of portable lamps is synchronized based on a signal from said spatial sensor in response to a change in spatial orientation of a first portable lamp of said plurality of portable lamps.

7. A lighting system of claim 1, wherein said at least one portable lamp includes a wireless communication interface.

8. A lighting system of claim 7, wherein said wireless communication interface is used to program said at least one portable lamp using an application on a mobile device.

9. A method of operating a lighting system comprising at least one portable lamp, said method comprising:
a) using a spatial sensor configured to detect a change in spatial orientation of said at least one portable lamp due to a user manipulating said portable lamp in space;
b) transmitting a signal to a controller located inside a translucent housing of said at least one portable lamp; and
c) using said controller to control operation of said at least one portable lamp based on said signal from said spatial sensor, such that said at least one portable lamp animates its illumination; and
wherein, upon the user's manual rotation of said translucent housing about a horizontal axis passing through said translucent housing, said controller causes said at least one portable lamp to enter a float mode, in which said control circuit dynamically changes which light emitting diode is on depending on the portable lamp's spatial orientation, and in which a light source appears to gravitate to a side of said translucent housing that is closer to ground.

10. A lighting system comprising at least one handheld lamp,
said at least one handheld lamp comprising:
a first light source configured to illuminate in a first direction;
a second light source configured to illuminate in a second direction different from said first direction;
a translucent shell enclosing an interior space, said translucent shell adapted to permit illumination from said first light source and said second light source to pass through it;
a spatial sensor for sensing changes in spatial orientation of said at least one handheld lamp based on a user's manipulation of said translucent shell;
a control circuit coupled to said spatial sensor for controlling operation of said at least one handheld lamp based on a signal from said spatial sensor; and
a power source for providing power to said first light source, said second light source, said spatial sensor, and said control circuit,
wherein said power source, said first light source, said second light source, said control circuit, and said spatial sensor are located within the interior space of said translucent shell, such that said power source and said sensor are directly covered under a translucent cover of said translucent shell; and
wherein said power source is positioned between said first light source and said second light source, and farther within said interior space from said translucent cover than said first and second light sources so as not to block light from said first light source and said second light source when said first and second light sources are activated.

11. A lighting system of claim 10, wherein said control circuit activates an at least one of said first light source and said second light source based on a signal from said spatial sensor.

12. A lighting system of claim 10, wherein said spatial sensor senses at least one of flipping, wiggling, lifting, and rotating of said translucent shell by said user.

13. A lighting system of claim 10, wherein said control circuit varies intensity of light generated by said at least one of said first light source and said second light source based on a signal from said spatial sensor.

14. A lighting system of claim 10, wherein said control circuit animates illumination from said handheld lamp by controlling at least one of an overall brightness of said handheld lamp and a fill level of the illumination in said handheld lamp.

15. A lighting system of claim 10, wherein said control circuit causes said at least one handheld lamp to enter a float mode, in which said illumination in said handheld lamp appears to gravitate to a side of said translucent shell that is closer to ground.

16. A lighting system of claim 10, wherein operation of said first and second light sources is synchronized based on a signal from said spatial sensor in response to a change in spatial orientation of said handheld lamp.

17. A lighting system of claim 10, wherein said at least one handheld lamp further comprises a wireless communication interface.

18. A lighting system of claim 17, wherein said wireless communication interface is used to program said at least one handheld lamp using an application on a mobile device.

* * * * *

UNITED STATES PATENT AND TRADEMARK OFFICE
CERTIFICATE OF CORRECTION

PATENT NO. : 11,039,514 B2
APPLICATION NO. : 16/241665
DATED : June 15, 2021
INVENTOR(S) : Lay et al.

It is certified that error appears in the above-identified patent and that said Letters Patent is hereby corrected as shown below:

On the Title Page

In the Assignee item (73), delete "Caster Sleep Inc." and insert --Casper Sleep Inc.--

Signed and Sealed this
Tenth Day of January, 2023

*Katherine Kelly Vidal*

Katherine Kelly Vidal
*Director of the United States Patent and Trademark Office*